United States Patent
Kang

(10) Patent No.: US 12,510,463 B2
(45) Date of Patent: Dec. 30, 2025

(54) MULTIFUNCTIONAL CORROSION MONITORING SYSTEM AND METHOD

(71) Applicant: Nexcorr, LLC, Dublin, OH (US)

(72) Inventor: Cheolho Kang, Dublin, OH (US)

(73) Assignee: Nexcorr, LLC, Dublin, OH (US)

( * ) Notice: Subject to any disclaimer, the term of this patent is extended or adjusted under 35 U.S.C. 154(b) by 259 days.

(21) Appl. No.: 18/299,474

(22) Filed: Apr. 12, 2023

(65) Prior Publication Data

US 2024/0344969 A1 Oct. 17, 2024

(51) Int. Cl.
*G01N 17/04* (2006.01)
*G01N 17/00* (2006.01)

(52) U.S. Cl.
CPC .......... *G01N 17/04* (2013.01); *G01N 17/006* (2013.01)

(58) Field of Classification Search
CPC .............................. G01N 17/04; G01N 17/006
See application file for complete search history.

(56) References Cited

U.S. PATENT DOCUMENTS

| | | | |
|---|---|---|---|
| 5,854,557 A | 12/1998 | Tiefnig | |
| 7,320,245 B2* | 1/2008 | Jaralla | G01N 17/04 73/431 |
| 7,508,223 B1* | 3/2009 | Yang | G01N 17/02 324/700 |
| 12,111,246 B2* | 10/2024 | Ki | G01N 17/04 |
| 2004/0055391 A1* | 3/2004 | Douglas | G01N 17/046 73/779 |
| 2010/0091930 A1* | 4/2010 | Lee | G01N 17/00 376/305 |
| 2013/0224516 A1* | 8/2013 | Kusinski | C22C 38/24 428/34.1 |
| 2015/0198519 A1* | 7/2015 | Smyrl | G01N 17/02 204/404 |
| 2016/0091411 A1* | 3/2016 | Hedtke | G01N 17/00 324/700 |
| 2023/0102362 A1* | 3/2023 | Lukács | G01N 17/006 324/700 |

FOREIGN PATENT DOCUMENTS

WO WO2021075698 4/2021

* cited by examiner

*Primary Examiner* — Akm Zakaria
(74) *Attorney, Agent, or Firm* — Standley Law Group LLP; Jeffrey S. Standley; Bryan P. Finneran

(57) ABSTRACT

A system and its method are provided for monitoring corrosion. An example includes a sensing unit having a specimen stack for measuring, in real time, pitting corrosion, and a separate plate for measuring, in real time, general corrosion. Electric current applied to each the specimen stack and the separate plate may be measured, and in one example, measured electrical resistance is used to estimate both pitting corrosion and general corrosion. An example specimen stack includes at least four specimens each separated from one another by an insulating layer. A transmitter may transmit data from the sensing unit to a processor, and software of the processor may be capable of organizing the data into graphs. An example of the system may be useful for detecting both pitting corrosion and general corrosion in a pipeline.

14 Claims, 20 Drawing Sheets

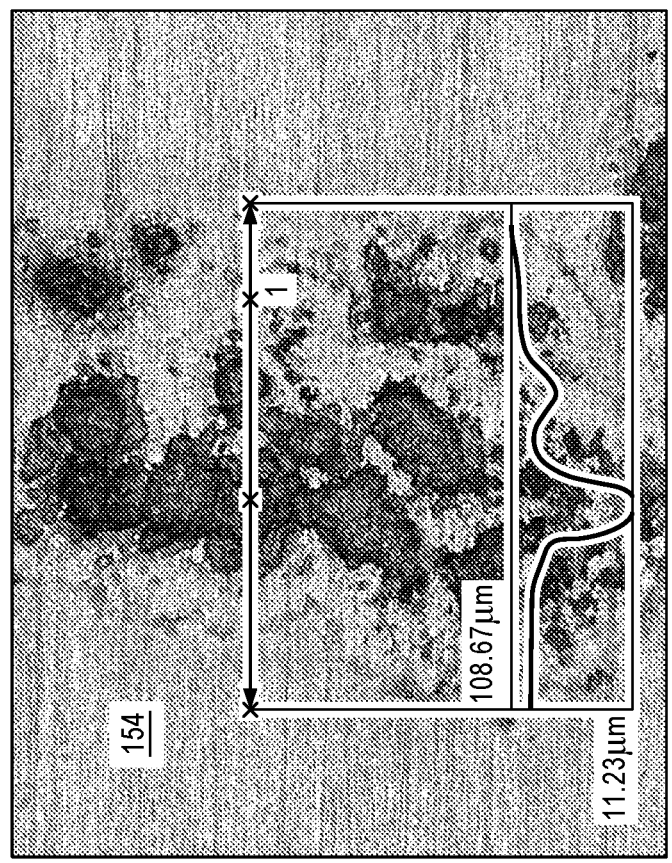
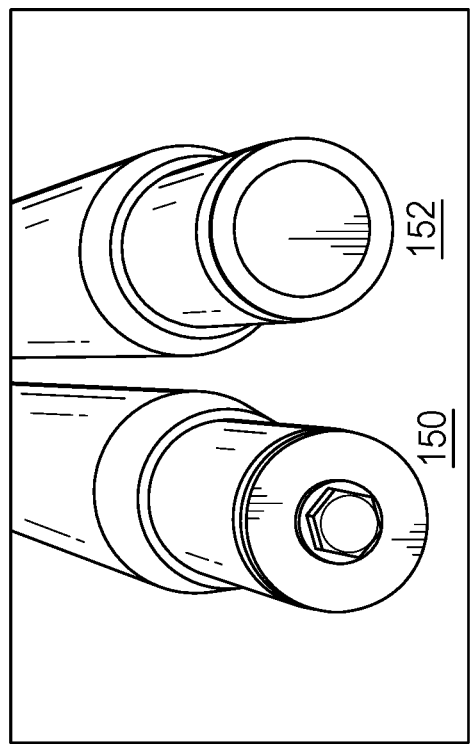
FIG. 20

MULTIFUNCTIONAL CORROSION MONITORING SYSTEM AND METHOD

CROSS-REFERENCE TO RELATED APPLICATIONS

This application is filed as original and makes no priority claim.

TECHNICAL FIELD

Embodiments of the present disclosure relate to a system and its corresponding method for monitoring corrosion. In one example embodiment, an exemplary sensing unit comprises a specimen stack for measuring, in real time, pitting corrosion, and a separate sensor (e.g., a conductive plate) for measuring, in real time, general corrosion. Electric current may be applied to each the specimen stack and the separate general corrosion sensor. In one example embodiment, measured electrical resistance is used to estimate both pitting corrosion and general corrosion. In one example embodiment, an exemplary specimen stack includes at least four specimens each separated from one another by a water-soluble insulating layer. The aforementioned example embodiment may be useful for detecting both pitting corrosion and general corrosion in a pipeline.

BACKGROUND AND SUMMARY OF THE INVENTION

Corrosion involves the damage and/or destruction of metallic material by way of a chemical and/or electrochemical reaction of the metallic material with oxidant(s). For example, rusting is a form of corrosion involving the formation of iron oxides in a metallic material, caused by iron in the metallic material chemically reacting with oxygen (e.g., from liquid water, air moisture, or the like). Although certain corrosion reduction techniques are well known, corrosion may prove inevitable in any number of different systems involving both metallic material and oxidants. Thus, corrosion monitoring may be important for determining when a system is compromised and/or requires maintenance, replacement, or the like based on the occurrence of significant corrosion. An example of a system susceptible to significant corrosion and thus requiring corrosion monitoring (e.g., to ensure safe and efficient operation) is a pipe and fluid system (e.g., a pipeline). A pipeline may provide an enclosed passage through which fluids (e.g., pressurized gas, oil, or the like) may travel (e.g., from a refinery to a consumption area). Metallic pipes (e.g., steel pipes) may corrode as a result of reacting with oxidants in one or more fluids proximate to the pipes.

Traditional techniques for predicting corrosion may include evaluating oxidant presence (e.g., measuring oxygen, hydrogen, or the like) at or near system material, and/or evaluating redox potential of system material. An issue with said techniques include that the techniques, by themselves, do not provide those tasked with system monitoring with any information about the presence, magnitude, and/or type of corrosion the metallic material itself may be experiencing over time. A known technique for determining when corrosion of metallic material itself occurs includes employing weight loss coupons (also referred to as "corrosion coupons") (the technique referred to herein as the "weight loss coupon technique"). The weight loss coupon technique may involve exposing, for a certain amount of time, a metallic test material to a system environment having oxidants present, and after said amount of time, analyzing how much the test material has corroded. For example, weight loss of the test material may be determined and connected with corrosion magnitude. The test material may represent actual metallic material employed in the system.

An issue with the weight loss coupon technique includes that the technique does not provide those tasked with system monitoring with any information about when (temporally) pitting corrosion occurs (pitting corrosion may be observed on a test material surface, but no information about when and at what rate the pitting corrosion developed is available). Pitting corrosion (also may be referred to herein as "localized corrosion," "local corrosion" or "intensive corrosion") may be particularly problematic to, e.g., fluid and pipe systems. Without a mechanism for determining when and at what rate pitting corrosion develops, by the time pitting corrosion is realized, major system issues may have already occurred (e.g., pipeline failure, major leaks, or the like).

Pitting corrosion may involve isolated pockets of corrosion causing depressions, cavities, holes, perforations, abrasions, erosion, some combination thereof, or the like in a pipe. These issues may lead to leaks, obstructions, collapse of material, safety issues, some combination thereof, or the like in a pipe system. With pitting corrosion, the localized pockets of corrosion may expand and penetrate metallic material rapidly. Pitting corrosion has proven to be difficult to predict, monitor and design against. Another form of corrosion includes general corrosion (also referred to as "uniform corrosion"), which may involve corrosion occurring over an entire surface at a substantially similar rate (e.g., as opposed to corrosion occurring in isolated pockets that may penetrate deep into a metallic material). In many cases, pitting corrosion is a greater contributor to corrosion-related pipeline failure compared to general corrosion.

Another issue with the weight loss coupon technique includes that very long exposure times (e.g., at least 90 days) may be required before any corrosion predictions and/or observations may be made. Yet another issue with the weight loss coupon technique includes that the technique is not available for continuous in-situ monitoring of a system (e.g., a pipeline).

An alternative technique for determining when corrosion of a metallic material occurs may include evaluating electromagnetism characteristics (e.g., electrical resistance) of the metallic material. Electrical resistance monitoring of a metallic material may permit those tasked with system monitoring to determine if and/or when general corrosion occurs, and to determine if injected corrosion inhibitors are effectively reducing or preventing significant general corrosion over time. However, a problem with known techniques involving evaluation of electromagnetism characteristics (e.g., known electrical resistance monitoring probes) may remain in that pitting corrosion is not detected. The lack of any pitting corrosion detection with known electrical resistance monitoring probes may limit, for example, the usefulness of said probes for monitoring corrosion in a pipeline, and the trust pipeline installers, administrators and the like have in data from said probes.

Another problem with known techniques involving evaluation of electromagnetism characteristics for corrosion detection may include that monitoring probes thereof are susceptible to corrosion damage affecting the capacity for said probes to operate for an extended amount of time. In environmental conditions involving significant oxidant presence, prolonged oxidant presence, and/or other perturbations, portions of said probes may degrade to the point the probes no longer function as intended. With the aforementioned known techniques, element life may be inversely proportional to sensitivity of devices employed by the techniques.

The aforementioned shortcomings speak to the need for improved corrosion monitoring involving a durable, robust system for detecting in situ and in real time both pitting corrosion and general corrosion.

In view of this, it is beneficial to have a multifunctional corrosion monitoring system and method.

An exemplary embodiment of the present invention provides a multifunction corrosion monitoring system and its corresponding method, wherein data pertaining to both pitting corrosion and general corrosion may be stored and/or transmitted in real time. An exemplary system may be configured to withstand any number of different environmental conditions and/or perturbations. An exemplary system may permit continuous in-situ monitoring (e.g., of a pipeline).

According to the present invention in one aspect, an exemplary system includes a sensing unit comprising a specimen stack, including a plurality of specimens, and a general corrosion sensor (e.g., plate) separate from the specimen stack. The sensing unit may be linked to a power controller and a transmitter. An amount of corrosion resistant material may be positioned between the general corrosion sensor and the specimen stack. The power controller may be configured to apply electric current to one or more specimens of the specimen stack and the general corrosion sensor. The transmitter may be capable of communicating a measurement of the electric current in the one or more specimens of the specimen stack to a processor to permit pitting corrosion to be estimated. The transmitter may also be capable of communicating a measurement of the electric current in the general corrosion sensor to a processor to permit general corrosion to be estimated.

According to the present invention in another aspect, an exemplary method includes providing a sensing unit comprising a specimen stack, including a plurality of specimens, and a general corrosion sensor (e.g., a plate) separate from the specimen stack. The method may further include providing a power controller and a transmitter. The method may also comprise providing an amount of corrosion resistant material between the general corrosion sensor and the specimen stack. Also, the method may include configuring the power controller to apply electric current to one or more specimens of the specimen stack and the general corrosion sensor. The method may additionally include configuring the transmitter to be capable of communicating a measurement of the electric current in the one or more specimens of the specimen stack to a processor to permit pitting corrosion to be estimated. The method may also include configuring the transmitter to be capable of communicating a measurement of the electric current in the general corrosion sensor to a processor to permit general corrosion to be estimated.

With exemplary embodiments of the present invention, continuous, user-friendly in-situ monitoring of a metallic structural arrangement (e.g., a pipeline) may be permitted by a durable and robust multifunctional corrosion monitoring system. Data collected from an exemplary system may be accurate and precise. Erosion data may also be obtained in addition to corrosion data. Additional advantages will become apparent to those of ordinary skill in the art based on the drawings and detailed description thereof.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 20 illustrates a weight loss coupon, a pitting detection probe, and metallic surface corrosion in accordance with an exemplary embodiment.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein may be made without departing from the scope and spirit of the present invention. In addition, descriptions of well-known functions and constructions are omitted for clarity and conciseness.

Figure 1:
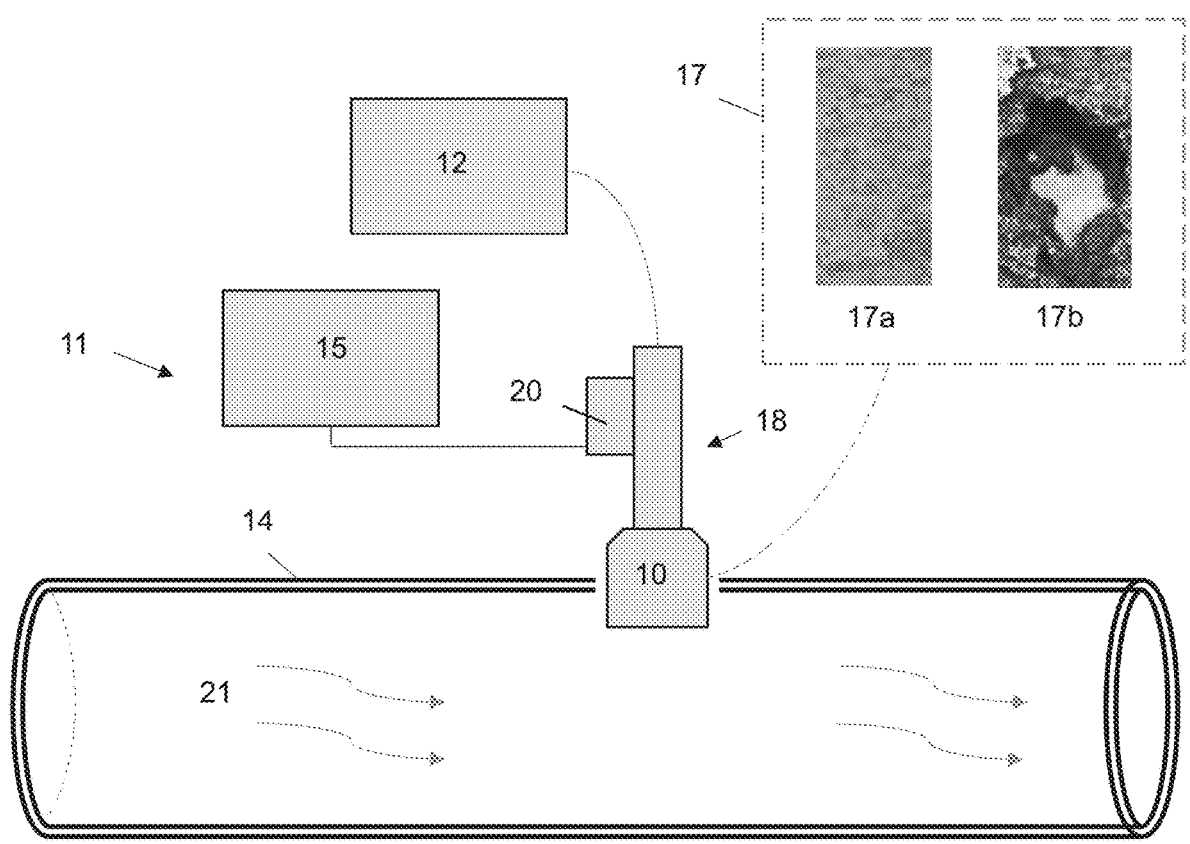
FIG. 1 illustrates an exemplary multifunctional corrosion monitoring system in accordance with an exemplary embodiment of the present invention.

Referring initially to FIG. 1, an exemplary multifunctional corrosion monitoring system 11 may be employed for monitoring corrosion of a pipe 14. The pipe 14 may surround flowing petroleum or a flowing pressurized gas 21, although such is not necessarily required. In this particular embodiment, thickness of the pipe 14 may be reduced by flow accelerated corrosion or erosion caused by the gas 21. It will be apparent to one of ordinary skill in the art that a pipe (e.g., 14) being monitored by an exemplary monitoring system (e.g., 11) may contain any number of different fluids without departing from the scope of the present invention.

Here, oxidants in the pressurized gas 21 may chemically react with metallic material of the pipe 14 to cause corrosion of the pipe 14. The monitoring system 11 may include a probe 18 having a probe head 10 (also referred to herein as a "sensing unit") configured to be inserted into the pipe 14, such that the sensing unit 10 may be exposed to the same media (e.g., 21) and redox conditions as that of the pipe 14 interior. An exemplary probe (e.g., 18) may be positioned in a pipe (e.g., 14) by way of any number of different pipe ports, channels, apertures, some combination thereof, or the like without departing from the scope of the present invention. The probe 18 may be designed to fit flush with a corresponding port, channel, aperture, some combination thereof, or the like. Said port, channel, aperture, some combination thereof, or the like may be installed on a pipe specifically for corrosion detection. Positioning of the probe 18 and components thereof may be achieved according to an exemplary position guide unit (may also be referred to as a "location guide unit"). It will be apparent to one of ordinary skill in the art that there may be any number of different devices, techniques or arrangements available for positioning an exemplary probe in an exemplary system or environment to be monitored without departing from the scope of the present invention.

The exemplary probe 18 of the FIG. 1 embodiment may be in electronic communication with a power unit 12. The power unit 12 may comprise a power source, power controllers, power control modules, some combination thereof, or the like. A power controller may be in electronic communication with stacked specimens of the sensing unit 10 by way of electrode wires. Measurements of the sensing unit 10 (e.g., resistance, voltage, current, and/or other electromagnetic phenomena) may be registered by a data logger 20, and may be communicated to a graph output unit 15. The graph output unit 15 may also be in electronic communication with the power unit 12, but such is not necessarily required. The graph output unit 15 may comprise a processor for generating a graph of measured data of the sensing unit 10, and a monitor for displaying the graph of measured data of the sensing unit 10. In certain embodiments, the graph output unit may be integrated into the data logger (e.g., 20) such that the data logger itself may generate and display graphs of measured data of the sensing unit 10. Displayed data may permit, for example, any number of different individuals tasked with monitoring corrosion (and/or erosion) of a system comprising metallics to evaluate when the system is compromised, and/or requires maintenance, replacement, or the like based on the occurrence of significant corrosion.

The sensing unit 10 may be configured to simultaneously register and transmit information about both 17 general corrosion 17a and pitting corrosion 17b. Physical deformation of stacked specimens (not shown) in the sensing unit 10, and variance in resistance measured in and/or between specimens having a current applied thereto may permit a graph output unit 15 to organize and display data for pitting corrosion (illustrative example shown at reference 17b) rate, magnitude, and the like. Physical deformation of a general corrosion sensor, and variance in resistance measured for the general corrosion sensor having a current applied thereto may permit a graph output unit 15 to organize and display data for general corrosion (illustrative example shown at reference 17a) rate, magnitude, and the like. It will be apparent to one of ordinary skill in the art that although corrosion data is illustrated herein in the form of graphs of a graph output unit, there may be any number of different methods available for transmitting and organizing measured sensing unit (e.g., 10) data without necessarily departing from the scope of the present invention. It is not necessarily required that measured sensing unit data be expressed in the form of graphs.

An exemplary transmitter may be integrated with the probe 18, and may be configured to transmit measured sensing unit data to a data logger 20, graph output unit 15, some combination thereof, or the like. An exemplary data logger (e.g., 20) may comprise a data logging system adapted to register, save, organize, some combination thereof, or the like measured sensing unit data. An exemplary data logger, graph output unit, some combination thereof, or the like may be configured to register, save, organize, communicate, display, some combination thereof, or the like in-situ measured sensing unit data in real time. By way of example and not limitation, corrosion rate and magnitude for any number of different pipes, tanks, or the like may be displayed in real time by way of a monitor of the graph output unit 15 to those tasked with monitoring corrosion of the pipes, tanks, or the like. In an exemplary embodiment, separate data displays may be simultaneously provided for pitting corrosion and general corrosion measurements. Said data displays may permit those tasked with monitoring corrosion to determine, with minimal effort, where gradual corrosion, rapid corrosion, some combination thereof, or the like are occurring in a system comprising metallics (e.g., a pipeline).

The system 11 may be implemented into any number of different pipelines, each of which may involve any number of different pipeline materials (e.g., iron, carbon, manganese, or the like in the piping). The specimens and general corrosion sensor of the sensing unit 10 of the probe 18 may comprise substantially identical material as that of the system being monitored. By way of example and not limitation, where the system being monitored is a pipeline, the specimens and general corrosion sensor preferably include substantially identical material to that of a pipe (14) of the pipeline (e.g., to permit inferences to be made about the pipe based on pitting and general corrosion measured in the sensing unit 10).

Exemplary system software may be configured to predict a relationship between flow medium characteristics (e.g., measured flow rate of fluid 21 in the pipe 14, measured flow velocity of the fluid 21 in the pipe 14) and degree of corrosion (predicted according to exemplary sensing unit 10 data). A high degree of corrosion estimated for the pipe 14 based on exemplary sensing unit 10 data (e.g., large holes detected in at least one specimen of the sensing unit 10) may correspond to high flow rate and velocity of the flow medium 21 in the pipe 14 (e.g., gas, oil, other fluid). By way of example and not limitation, an exemplary system 11 may be configured to predict corrosion rate based on the measured flow rate of a particular fluid 21 and historical data comparing flow rate to degree of corrosion. Those tasked with maintaining a pipeline may determine when to treat, repair and/or replace various portions of the pipeline by comparing degree of corrosion data and/or predicted corrosion rate with pipe characteristic data (e.g., pipe thickness necessary for the pipe 14 to operate properly). As a specific, non-limiting example, a date when treatment, repair, and/or replacement of the pipe 14 is estimated to be necessary may be communicated to a user by the exemplary system 11 based on a comparison of predicted corrosion rate with pipe characteristic data. After said date and initial treatment, repair, and/or replacement of the pipe 14 has occurred, the user may subsequently be informed by the system 11 of when future treatment, repair, and/or replacement is estimated to be necessary (for continued management of a pipeline).

Although certain embodiments described herein are described with reference to pipelines, it will be apparent to one of ordinary skill in the art that an exemplary multifunctional corrosion monitoring system may be implemented in any number of different systems (involving any number of different fluid mediums) benefiting from pitting and general corrosion monitoring without departing from the scope of the present invention. It will also be apparent to one of ordinary skill in the art that data provided by an exemplary multifunctional corrosion monitoring system may also be analyzed to determine erosion magnitude, rate, and the like in a system being monitored. Corrosion (pitting and general) rates may be determined based on real time transmission of measured sensing unit 10 data over time to one or more data analysis modules, and taking time derivatives of said data. With respect to pitting corrosion, separate pitting corrosion graphs may be generated for each localized region of corrosion, but such is not necessarily required.

An exemplary system (e.g., 11) may be configured to operate in any number of different environmental conditions and withstand any number of different perturbations. By way of example and not limitation, external material of an exemplary probe may comprise alloys and other material capable of withstanding flow of highly pressurized fluid over time, extreme weather over time (an exemplary probe is not necessarily limited to interior monitoring, such as measuring inside a pipe, and thus may be exposed to weather in certain applications), significant fluid turbulence over time, heavy oxidizing conditions, some combination thereof, or the like. A specimen stack and general corrosion sensor of an exemplary probe may also each be provided in a sufficient thickness to permit an exemplary probe to accurately and effectively transmit data for a significant amount of time (in contrast to known corrosion monitoring, where pitting and/ or general corrosion may quickly exhaust available test material when corrosion is significant). An exemplary multifunctional corrosion monitoring system may provide detection of corrosion problems, permit control of the effectiveness of corrosion protection, permit estimation of system inspection and/or maintenance requirements, permit estimation of system useful service life, some combination thereof, or the like.

Figure 2:
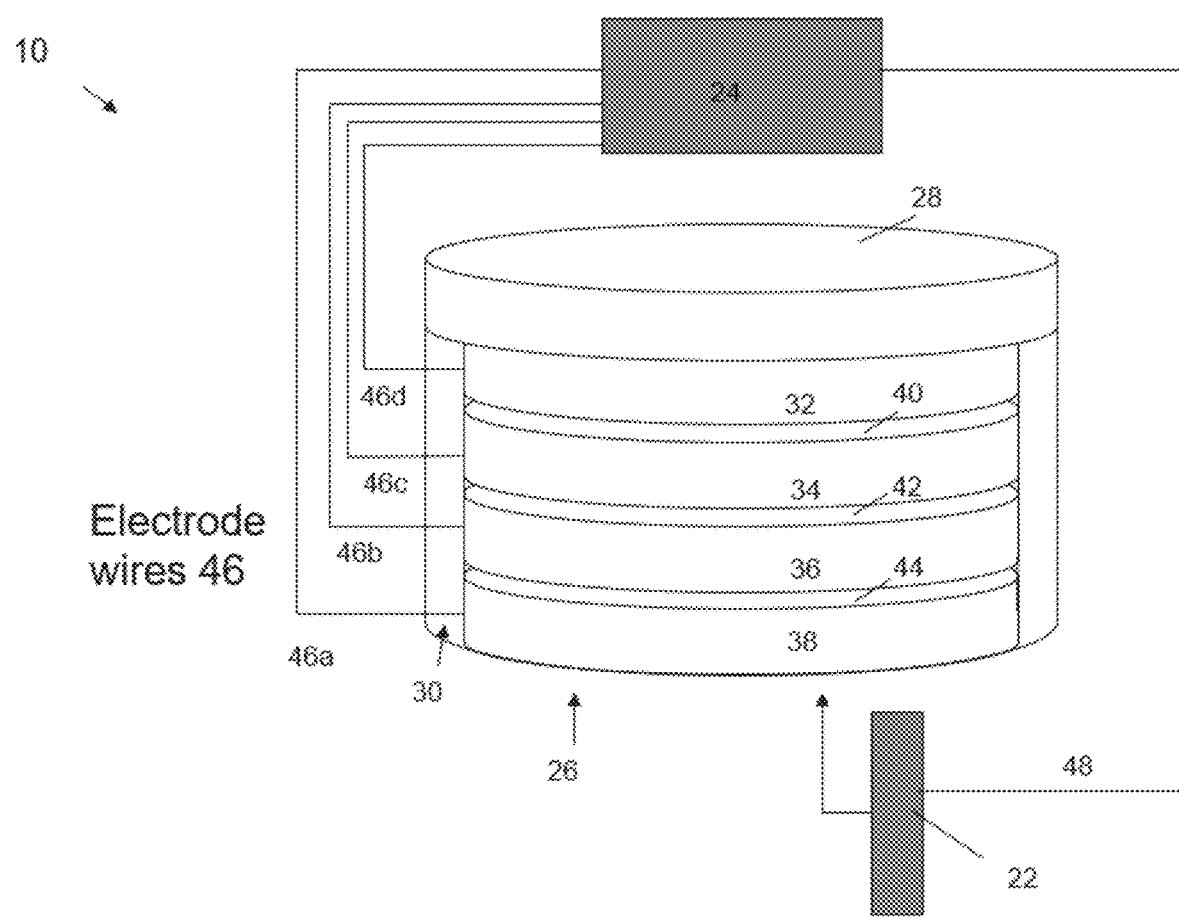
FIG. 2 illustrates an exemplary multifunctional corrosion monitoring probe head in accordance with an exemplary embodiment.
Figure 13:
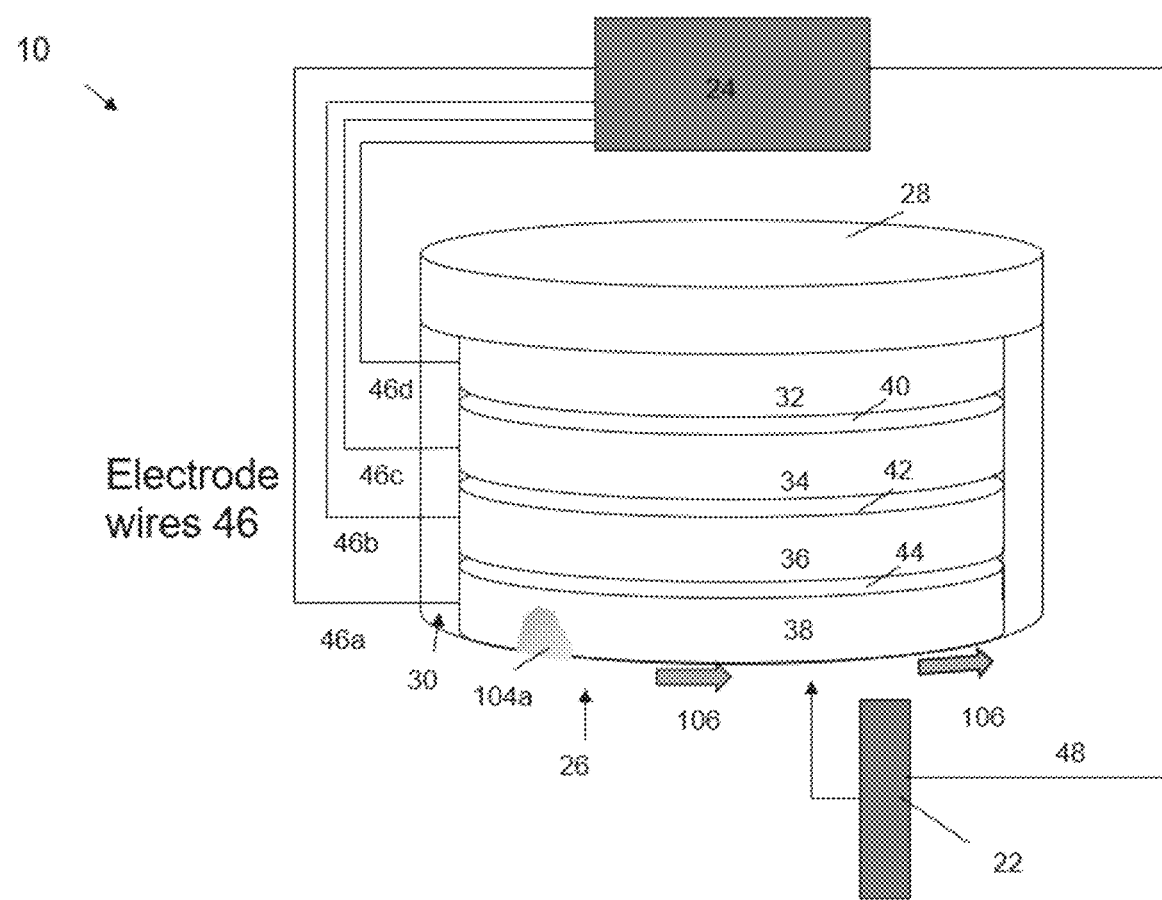
FIG. 13 illustrates exemplary pitting corrosion and general corrosion detection of the FIG. 2 embodiment.
Figure 14:
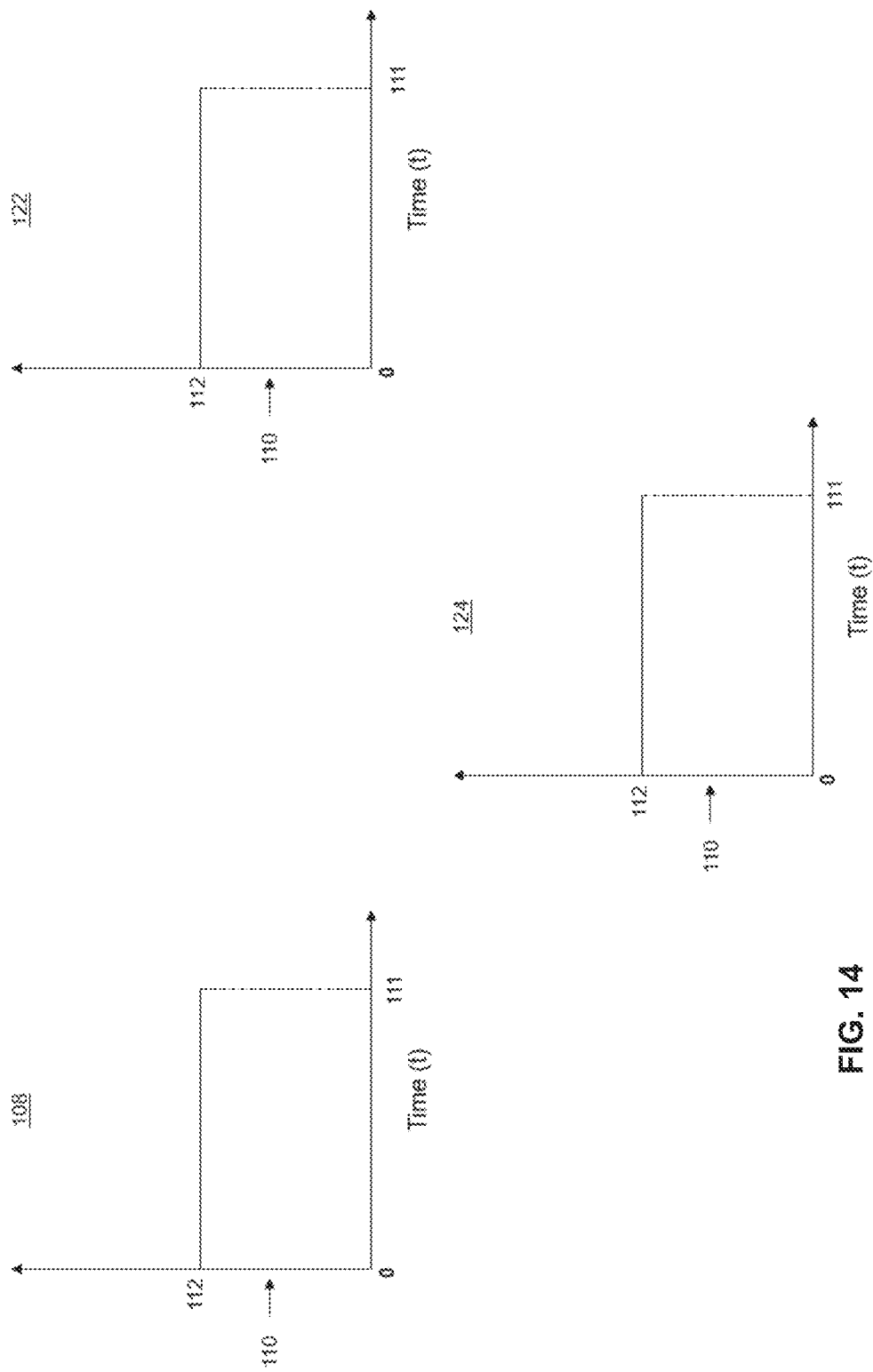
FIG. 14 illustrates exemplary data analysis of the FIG. 13 embodiment.
Figure 15:
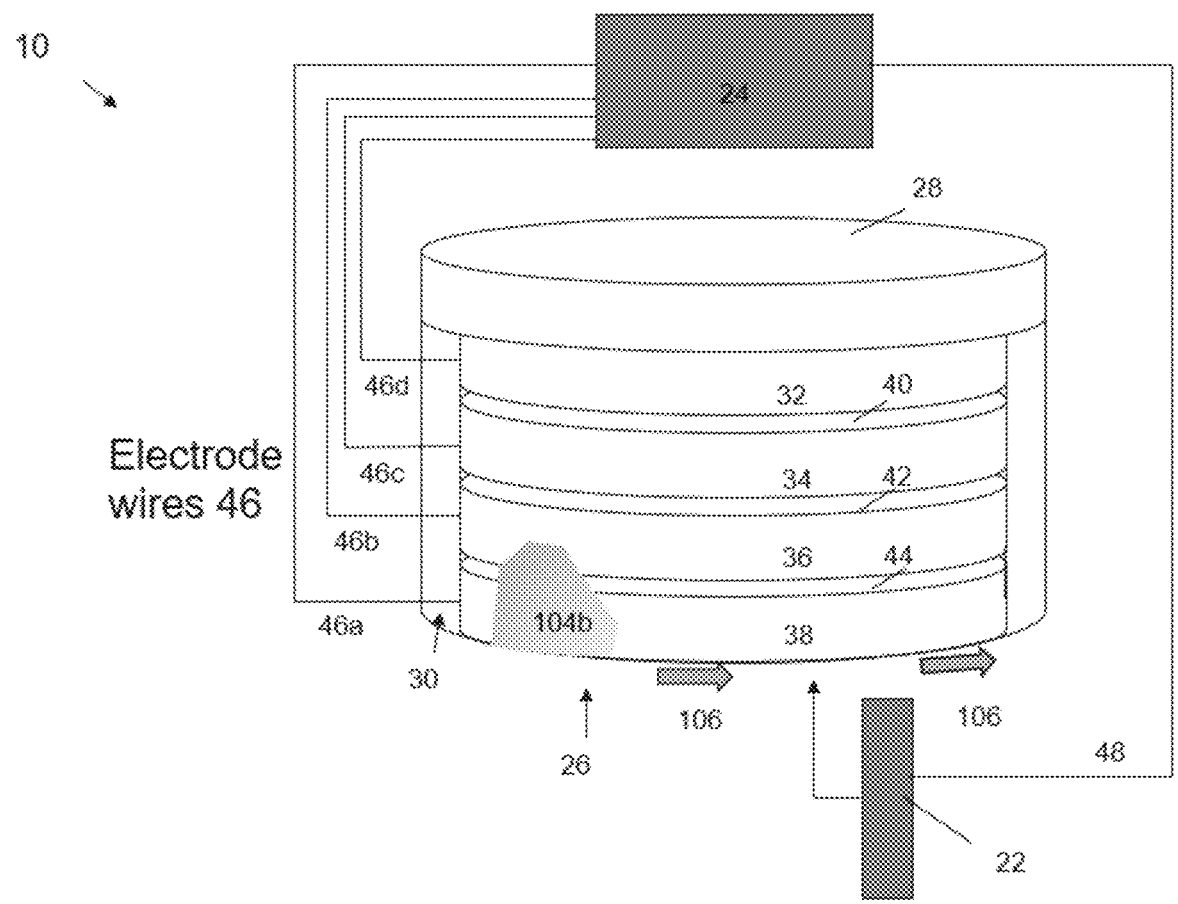
FIG. 15 illustrates other exemplary pitting corrosion and general corrosion detection of the FIG. 2 embodiment.
Figure 16:
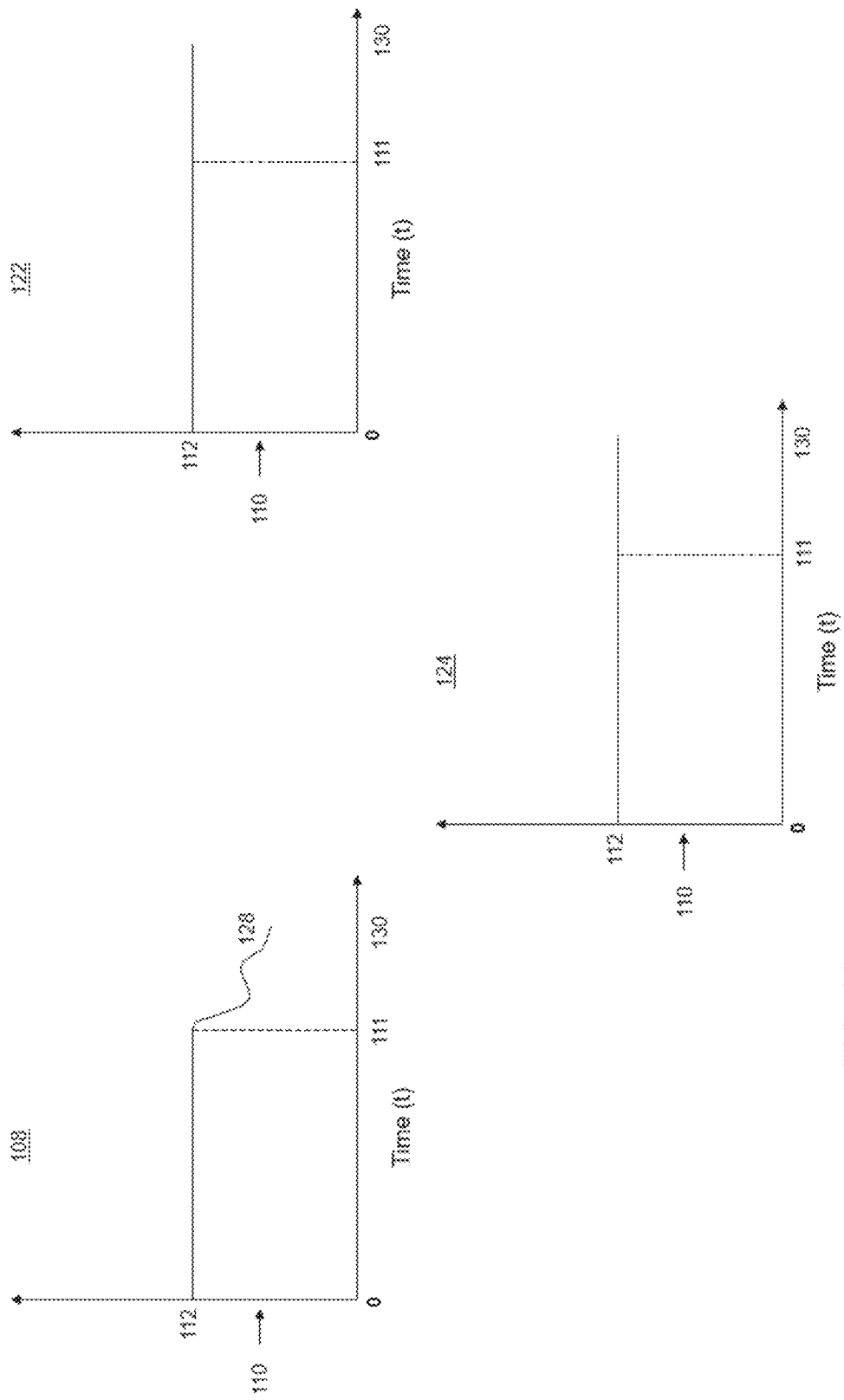
FIG. 16 illustrates exemplary data analysis of the FIG. 15 embodiment.

Referring to FIGS. 2, 13 and 15, a specimen stack 26 having specimens 32, 34, 36, 38 and insulating layers 40, 42, 44 (between the specimens) of an exemplary sensing unit 10 are shown. The stack 26 may be positioned within an insulating module 30 below a cap 28 thereof. Also shown are a general corrosion sensor plate 22 (and an electrode wire 48 permitting a voltage to be applied to the general corrosion sensor plate 22), electrode wires 46a-d (here, one line 46 is provided for each specimen of the stack 26), and a power controller 24 of the sensing unit 10. Referring now specifically to FIG. 2, a bottom end of the sensing unit 10 may be inserted through a portion of a pipe. The bottom end may be repositioned within the pipe (by action of a user, action of an autonomous position guide unit, some combination thereof, or the like). The insulating module 30, together with the insulating layers, 40, 42, 44, may prevent certain electromagnetic radiation (referred to herein as "EM radiation"), including, e.g., EM radiation generated by the power controller 24, from entering the specimens 32, 34, 36, 38. Exemplary insulation layer 40, 42, 44 material may be highly durable, and capable of withstanding extreme pressure and temperature conditions.

The insulating module 30 and the insulating layers 40, 42, 44 (also referred to herein as "insulation plate layers") may each comprise any number of different materials with significant electric insulation properties (properties substantially restricting free flow of electric current). As a non-limiting example, each insulation plate layer 40, 42, 44 may comprise water soluble filament laminated between specimens, the insulation plate layers having a thickness (e.g., 2-3 µm, which may be significantly smaller than the thickness of each specimen) sufficient to substantially restrict free flow of electric current between different specimens 32, 34, 36, 38.

A first insulating layer 44 may be positioned between a first specimen 38 and a second specimen 36. A second insulating layer 42 may be positioned between the second specimen 36 and a third specimen 34. A third insulating layer 40 may be positioned between the third specimen 34 and a fourth specimen 32. Each insulating layer 40, 42, 44 may have substantially the same thickness as the other insulating layers, although such is not necessarily required. The positioning of each specimen 32, 34, 36, 38 between insulating layers (e.g., 40, 42, 44), and within an insulating module 30, may prevent unwanted EM radiation from entering each specimen 32, 34, 36, 38. Exemplary water-soluble material of insulators 40, 42, 44 may provide an advantage of initially causing significant electrical resistance between each specimen 32, 34, 36, 38.

In an exemplary embodiment, where the first specimen 38 is not penetrated by pitting corrosion, electrical resistance in each specimen 32, 34, 36, 38 may remain substantially consistent and/or unchanged. Where the first specimen 38 is only partially penetrated by pitting corrosion (e.g., 104a in FIG. 13), resistance measured for both the first 38 and second 36 specimens may be maintained at a high value due to the continued presence of the insulating layer 44 (in this particular embodiment, resistance of the first specimen 38 only is not measured, but rather for both the first 38 and second 36 specimens-resistance measuring may vary, however, without departing from the scope of the present invention). However, when the first specimen 38 is fully penetrated by pitting corrosion (e.g., perforation through the first specimen 38 shown at 104b in FIG. 15), the water-soluble insulating layer 44 there above (in addition to a layer there below in certain embodiments) may dissolve. A short circuit phenomenon may occur as a result of the dissolution of the insulating layer 44. Electrical resistance measured for both the first specimen 38 and the second specimen 36 may significantly decrease or be changed as soon as pitting corrosion (104b in FIG. 15) extends beyond the first specimen 38 and causes dissolution of layer 44. Said decrease or change in electrical resistance may be the result of electrical connection being formed between the first 38 and second 36 specimens (electrical connection resulting from dissolution of the water-soluble insulating layer 44 therebetween).

Each insulating layer 40, 42, 44 may be configured to dissolve when pitting corrosion penetrates through a specimen below the insulating layer 40, 42, 44. Specifically, fluid or moisture (e.g., fluid from a pipeline fluid pathway) may contact an insulating layer as a result of pitting corrosion forming one or more holes, cavities, depressions, perforations or the like below the insulating layer, and said fluid or moisture entering the one or more holes, cavities, depressions, perforations, or the like, causing the insulating layer to dissolve. An exemplary system may be configured to determine when different specimens (e.g., 36, 38) become electrically connected (e.g., resulting from one electric current being applied to each specimen) with one another as a result of dissolution of an insulating layer (e.g., 44) therebetween.

As a non-limiting example, the dissolving of the insulating layer 44 may permit pitting corrosion detection with respect to the first 38 and second 36 specimens. The first specimen 38 and the second specimen 36 may be electrically connected following dissolution of the insulating layer 44, and the system may determine accordingly (e.g., from measured resistance in relation to an applied current to the specimens 36, 38) that pitting corrosion has penetrated through the first specimen 38. In certain exemplary embodiments, a short circuit phenomenon occurs and is detected when specimens 36 and 38 become electrically connected with one another. Pitting corrosion magnitude in one or more specimens 32, 34, 36, 38 (e.g., perforation(s) extending into one or more of the specimens) may be determined based on electrical measurements thereof, and corrosion of a pipe may be predicted based on comparing said magnitude(s) with a predetermined initial corrosion level of the pipe. Electrical measurements may be performed by and/or registered by one or more exemplary measuring units positioned within or proximate to the sensing unit 10. An exemplary prediction unit may be linked to the one or more measuring units to translate electrical measurement data to degree of corrosion data (e.g., for predicting corrosion of a pipe represented by the sensing unit 10 based on said degree of corrosion data compared to an initial predetermined corrosion level of the pipe).

An exemplary measuring unit may be configured to determine when a short circuit phenomenon has occurred, and communicate said phenomenon to a system processor for alerting system user(s) that a certain specimen is now experiencing pitting corrosion. An exemplary sensing unit may be configured to detect pitting corrosion of any number of different shapes, sizes, and particular number of holes, cavities, depressions, perforations, and the like. In one non-limiting example, as soon as a new pipe is introduced to a pipeline, the corrosion rate of any specimen (32, 34, 36, 38) may be evaluated over time (and the time of electrical connection with another specimen may be registered) to permit those tasked with pipeline maintenance to monitor corrosion level of the pipe over time. Monitored corrosion level may dictate treatment, repair, replacement, some combination thereof, or the like of the pipe.

It will be apparent to one of ordinary skill in the art that the particular sensing unit shape, and the sizes, shapes and numbers of components defining the sensing unit, and the arrangement of said components, may be varied without necessarily departing from the scope of the present invention. For example, an exemplary insulation plate layer and an exemplary insulating module may each have any number of different thicknesses without departing from the scope of the present invention. The insulating module 30 may comprise cellulose, rubber, ceramics, plastic, some combination thereof, or the like. The specimens 32, 34, 36, 38 may each comprise carbon steel (e.g., to simulate carbon steel piping in a pipeline), although such is not necessarily required. Any number of different materials may be employed in an exemplary specimen without necessarily departing from the scope of the present invention.

Electrode wires 46a-d each connected to a specimen (here, carbon steel layers 38, 36, 34, 32, respectively) may each be linked to a power controller 24. Electricity may be applied to the carbon steel layers 32, 34, 36, 38 by way of the power controller 24. The power controller 24 may be in electronic communication with any number of different power sources. The power controller 24 may include a first power control module connected to a first electrode wire 46a, a second power control module connected to a second electrode wire 46b, a third power control module connected to a third electrode wire 46c, and a fourth power control module connected to a fourth electrode wire 46d. The power controller 24 may also include another power control module connected to the wire 48 for the general corrosion sensor plate 22. Each power control module may be individually operated, and configured to apply electric current to at least one specimen or sensor plate. Each power control module may be in electronic communication with one another, and may be configured to transmit data to a processor (e.g., a processor of an exemplary graph output unit). It will be apparent to one of ordinary skill in the art that the specific electronic configurations described herein are merely illustrative, and modifications may be made without necessarily departing from the scope of the present invention.

Still referring to FIG. 2, the first specimen layer 38 may be associated with a first voltage, the second specimen layer 36 may be associated with a second voltage, the third specimen layer 34 may be associated with a third voltage, and the fourth specimen layer 32 may be associated with a fourth voltage. The voltage source may be connected to a circuit in a transmitter. The power controller 24 may be configured to apply an electric current to each carbon steel layer 32, 34, 36, 38 and the general corrosion sensor 22 by way of the wires 46, 48. Measuring units may communicate electrical information about the specimens (e.g., 32, 34, 36, 38) and general corrosion sensor plate 22 to a server. As a non-limiting example, when electric current (e.g., AC current) flows in each specimen 32, 34, 36, 38, resistance in and/or between specimens (in Ohms) may be measured (e.g., by an analog multimeter, digital multimeter, or the like). With respect to the four lines 46a-d of the specimen stack 26 (one line for each specimen), resistance of each front and rear end of a line may be measured to evaluate pitting corrosion penetration.

In the FIG. 2 embodiment, before pitting corrosion occurs, resistance values measured for multiple specimen layers 38, 36, 34, 32 may be initially consistent at high values due to the presence of insulating layers 44, 42, 40. A significant decrease or change in resistance measured across both a lower (e.g., first specimen 38) and higher (e.g., second specimen 36) specimen layer may correspond to pitting corrosion fully penetrating through at least the lower of the two specimen layers. As electrical connection is formed between two specimens after an insulating layer therebetween dissolves, steadier electric current flow may occur across the two specimens (thus lower resistance). Alternatively, or additionally, a measured change in resistance across a single specimen layer (e.g., as opposed to a measured change in resistance for two specimen layers) may correspond to pitting corrosion (e.g., as cavities or abrasions form in the specimen, electric current across the specimen may change as a result), but such is not necessarily required. The time and magnitude of the change(s) in resistance may be communicated in real time to a data analysis module, which may determine time, magnitude, rate, and the like of pitting corrosion based on measured resistance magnitudes over time.

Alternatively, or additionally, as electric current flows in each specimen 32, 34, 36, 38, inductance thereof (in H) may be measured (e.g., by an LCR meter), and a decrease in inductance measured for a specimen layer may correspond to pitting corrosion occurring in the specimen layer (e.g., as cavities or abrasions form in the specimen, there is less opposition to changes in current). The time and magnitude of the decrease(s) in inductance may be communicated in real time to a data analysis module, which may determine time, magnitude, rate, and the like of pitting corrosion based on measured inductance magnitudes over time.

With certain exemplary embodiments, detection of a short circuit by an exemplary measuring unit may correspond to the occurrence of pitting corrosion in a specimen (e.g., as a result of electrical connection forming between two specimens experiencing pitting corrosion). Short circuit detection may be communicated to a system server/processor to permit the system to register when pitting corrosion occurs in a particular specimen. Information about detected pitting corrosion (e.g., timing of corrosion, degree of corrosion) may be compared with information about when a pipe (or a similar device being monitored) was installed, initial corrosion level of the pipe, the type of medium (e.g., oil, gas) inside of the pipe or similar device, and the like to permit those tasked with monitoring corrosion to make informed decisions about managing corrosion and addressing risks related thereto. Wired electrical connections may be configured to dissolve after the specimen associated with said wired electrical connections has been fully penetrated by pitting corrosion (e.g., such that each of a specimen fully penetrated by pitting corrosion and a specimen partially penetrated by pitting corrosion there above each share one electrode wire), but such is not necessarily required.

In the aforementioned illustrative example, (where an insulating layer between the two specimens has dissolved), one current may be applied to both specimens (e.g., 36, 38). Electrical connection between the two specimens may cause a short circuit. An alert may be sent to an operator as a result of the short circuit (as well as information about where the pitting corrosion resulting in the electrical connection occurred), and the operator may elect to replace a corroded pipe as a result of the alert.

It will be apparent to one of ordinary skill in the art that there may be any number of different methods for analyzing changes to electric current flows in and/or between each specimen to determine pitting corrosion time, magnitude, rate, and the like without necessarily departing from the scope of the present invention. Exemplary measurement circuitry may be temperature stable and sensitive to voltage differences. An exemplary measuring unit may also be configured to measure the number and/or size of one or more holes, cavities, depressions, or the like in an exemplary sensing unit to help evaluate corrosion progression (e.g., larger holes in one or more sensing unit specimens may correspond to higher estimated pitting corrosion in a pipe). By way of example and not limitation, the number and/or size of holes, cavities, depressions, or the like may be determined by image pattern analysis (e.g., a neural network may promote identification of hole/cavity numbers, shapes, sizes, and the like). An exemplary sensing unit may be drilled, perforated, or the like by an operator for obtaining additional information about corrosion experienced by the sensing unit. All information pertaining to degree of corrosion may be stored to a memory of an exemplary system.

As pitting corrosion expands from the first specimen 38 (referred to herein as "first pitting"), to subsequent specimen layers 36, 34, 32 (referred to herein as "second pitting," "third pitting," and "fourth pitting," respectively), predictions may be made that pockets of isolated corrosion are penetrating deeper into metallic material of a system. By introducing a fourth 32 and optionally subsequent specimen layers (the present invention is not limited to four or less specimen layers, and more than four specimen layers may be employed in certain exemplary embodiments), both deeper pitting corrosion penetration may be predicted, and the duration for which the sensing unit 10 may last (e.g., before significant corrosion negates usefulness of the sensing unit 10) may be increased. Fourth and subsequent pitting may correspond to the occurrence of substantial pitting corrosion. Thus, introducing subsequent specimen layers may increase the durability, useful lifetime, prediction capacity and the like of an exemplary sensing unit 10. Here, fourth pitting corresponds to significant penetration of a pocket of isolated corrosion. It will be apparent to those of ordinary skill in the art that the particular size and/or shape of each specimen may be varied without necessarily departing from the scope of the present invention. Likewise, the particular size and/or shape of an exemplary probe may be varied without necessarily departing from the scope of the present invention.

Each specimen 32, 34, 36, 38 of the specimen stack 26, and the general corrosion sensor plate 22 may comprise substantially identical material as that of a system/apparatus comprising metallics being monitored (e.g., a pipeline). By way of example and not limitation, carbon steel layers 32, 34, 36, 38 may each comprise substantially identical material to that of a carbon steel pipe being monitored. Any number of different conductors may define the specimens of an exemplary specimen stack without departing from the scope of the present invention. A fourth specimen 32 may be thicker than a third specimen 34. The third specimen 34 may be thicker than a second specimen 36. The second specimen 36 may be thicker than a first specimen 38. The fourth specimen 32 may be greater than 100 µm thick. The third specimen 34 may be approximately 100 µm thick. The second specimen 36 may be approximately 60 µm thick. The first specimen may be approximately 40 µm thick. The aforementioned thicknesses are merely illustrative, and variations in specimen thickness may be made without necessarily departing from the scope of the present invention. Greater thicknesses in higher specimen layers may permit deeper penetrating pitting corrosion to be monitored. Smaller thicknesses in lower specimen layers may permit pitting corrosion to be detected within a shorter amount of time.

A benefit to providing a separate general corrosion sensor plate 22 includes that general corrosion of a system may still be monitored even after one or more specimen layers (e.g., 38, 36) of the specimen stack 26 have been corroded. The general corrosion sensor plate 22 may be positioned in a corrosion resistant medium (comprising material not having a tendency to corrode) (e.g., ceramic, a corrosion resistant alloy, some combination thereof, or the like) such that only a bottom side face of the plate 22 is exposed to fluid media of the system being monitored (e.g., the inside of a pipe). While pitting corrosion may degrade or even fully disintegrate specimen layers (e.g., 38, 36) of an adjacent specimen stack 26, said pitting corrosion may be prevented from expanding into the general corrosion sensor plate 22, causing like degradation or disintegration thereof. Known corrosion monitoring systems lack any separate general corrosion sensor plate 22 protected from expanding corrosion across the remainder of test material. The general corrosion sensor plate 22 may have a narrow, elongate shape such that corrosion on the bottom side face of the plate 22 may be more indicative of general corrosion (the narrow, elongate shape may cause the plate 22 to be less susceptible to pitting corrosion than the stack 26, but still fully susceptible to uniform corrosion). The corrosion resistant medium may be configured to permit a new general corrosion sensor plate 22 to be inserted into the medium in the event an old, degraded general corrosion sensor plate is desired to be removed therefrom.

A voltage may be applied to the general corrosion sensor plate 22 (by wire 48), and a measured resistance, inductance or the like from the plate 22 may be communicated in real time to a data analysis module, which may determine time, magnitude, rate, and the like of general corrosion based on measured resistance, inductance, or the like magnitudes over time. The data analysis module may be configured to register, analyze and display concurrently data for both pitting corrosion (determined from specimen stack 26) and general corrosion (determined from general corrosion sensor plate 22). By way of example and not limitation, changes in resistance for each of various specimens of the specimen stack 26 and the general corrosion sensor plate 22 may be analyzed by a data analysis module, and displayed in one or more graphs. As a specific example, annual pitting corrosion rate and annual general corrosion rate may both be calculated. It will be apparent to one of ordinary skill in the art that modifications to the size, shape, and position on the probe of an exemplary general corrosion sensor plate may be made without necessarily departing from the scope of the present invention.

A transmitter may periodically measure resistance differences between each of the specimens 32, 34, 36, 38 to determine size and/or penetration depth of pitting corrosion. Representative electrical resistance (E/R) may be used in a corrosion state measurement (e.g., due to its high versatility), although such is not necessarily required. Electrical resistance of sensor parts (e.g., specimens 32, 34, 36, 38 and general corrosion sensor plate 22) may be compared with electrical resistance of reference parts to evaluate corrosion progression in the sensor parts (e.g., by translating electrical resistance data into metal loss signal data). Corrosion rate may be determined by taking the time derivative of plotted metal loss signal. Exemplary software instructions of an exemplary data analysis module may permit general and pitting corrosion magnitudes and rates to be determined and displayed.

Figure 3:
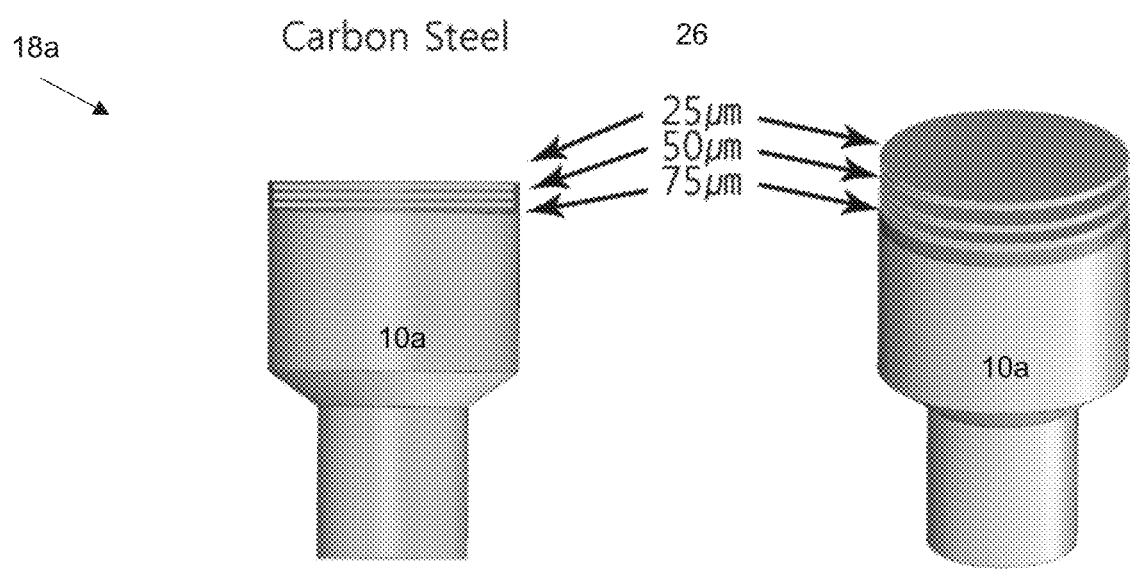
FIG. 3 illustrates an exemplary pit detection probe having a plurality of carbon steel layers.

Referring to FIG. 3, an alternative probe 18a for pitting corrosion detection may comprise three carbon steel layers 26 (e.g., a 25 µm first carbon steel layer at an end of the head 10a of the probe 18a, a 50 µm intermediate/second carbon steel layer, and a 75 µm third carbon steel layer). This particular probe 18a may exclude a general corrosion sensor plate. It will be apparent to one of ordinary skill in the art that any number of multifunctional corrosion monitoring probes may be employed in a system desired to be monitored, and additionally, any number of pitting corrosion detection probes may also be employed. Employing multiple probes may be beneficial for monitoring varying types of corrosion across multiple locations in a system (e.g., a pipeline). Separate exemplary multifunctional corrosion monitoring probes may be employed at different ports across a pipeline. A location guide unit may be configured to accurately adjust the exact location of an exemplary probe. A location guide unit may include a location sensor configured to store and/or transmit information (e.g., through a notification unit) about where particularly corrosion detection is occurring. A location guide unit may adjust the position of the probe based on the degree of corrosion occurring in the sensing unit thereof (e.g., repositioning may occur after electrical connection forms between two different specimens). Accordingly, those tasked with monitoring corrosion may be permitted to evaluate in real time both how and where corrosion is occurring. It will also be apparent to one of ordinary skill in the art that carbon steel layer thicknesses may be varied without necessarily departing from the scope of the present invention (e.g., some carbon steel layers may have a thickness around 40 µm). In some embodiments, a maximum pitting depth may be 75 µm, although such is not required. Providing thinner specimens at or near the bottom of an exemplary probe may permit initial low (e.g., micro) levels of corrosion to be measured and evaluated within a short amount of time.

Figure 4:
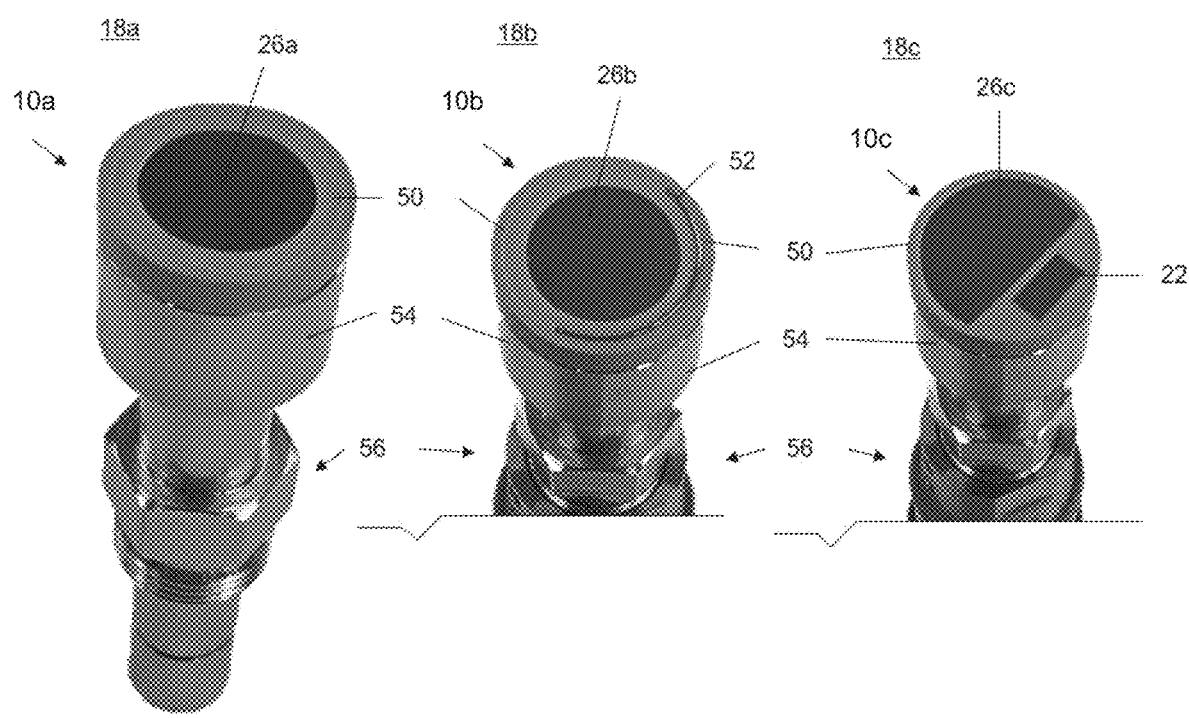
FIG. 4 illustrates various exemplary corrosion monitoring probe heads.
Figure 5:
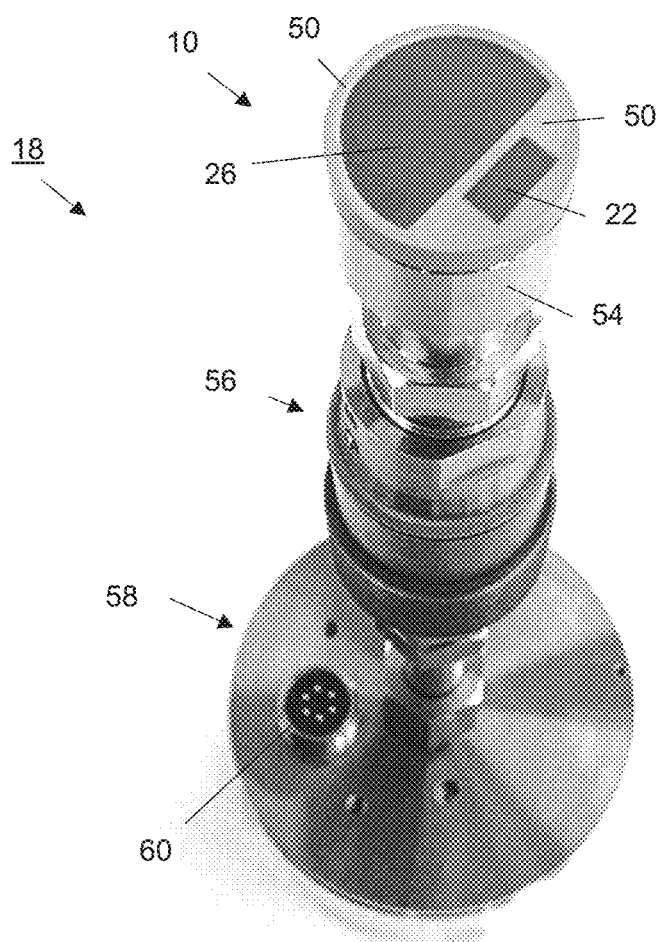
FIG. 5 illustrates an exemplary multifunctional corrosion monitoring probe in accordance with an exemplary embodiment.
Figure 6:
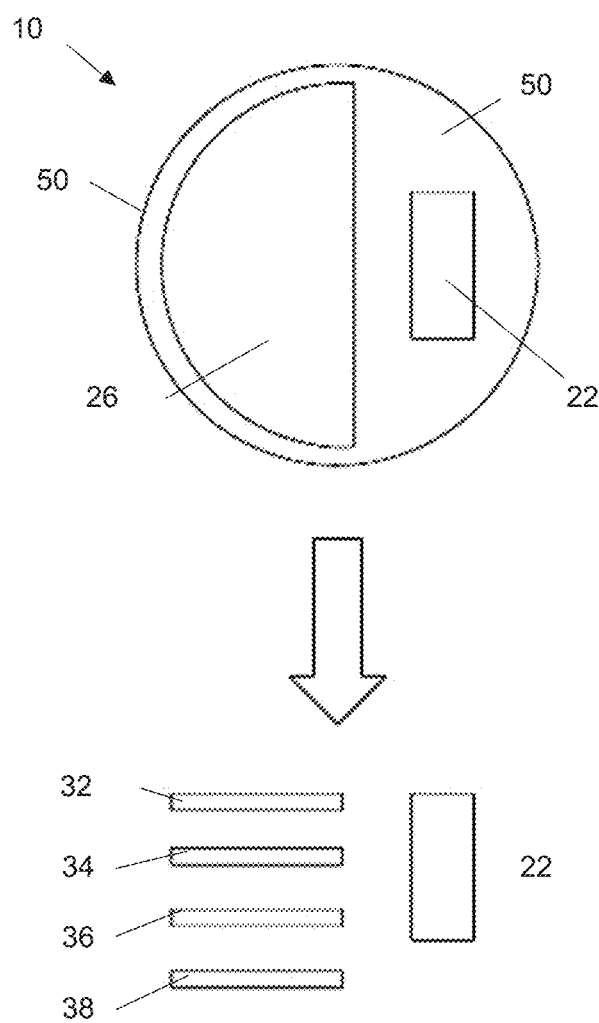
FIG. 6 illustrates exemplary logic for a preferred multifunctional corrosion monitoring probe of the FIG. 1 embodiment.

Referring now to FIGS. 4-6, various exemplary corrosion monitoring probes 18a-c are shown (in FIGS. 5-6, the exemplary multifunctional corrosion monitoring probe 18c is labeled with reference 18, the exemplary sensing unit 10c thereof is labeled with reference 10, and the exemplary specimen stack 26c thereof is labeled with reference 26—sublabel "c" has been added in FIG. 4 only for illustrative purposes). With the probe 18c, the general corrosion sensor plate 22 is positioned within a substantially corrosion resistant housing 50 of the sensing unit 10c. The housing 50 may also surround a specimen stack 26c for detecting pitting corrosion. The specimen stack 26c may include a plurality of specimens 32, 34, 36, 38. The sensing unit 10c may be positioned in a sensing unit connection apparatus 54 configured to receive and secure the sensing unit 10c with respect to a remainder of the probe 18c. The probe connection apparatus 54 may be positioned between the sensing unit 10c and a remaining shaft 56 of the probe 18c. It will be apparent to one of ordinary skill in the art that the particular shape and/or size of the probes 18a-c illustrated herein may be varied without necessarily departing from the scope of the present invention.

Referring now to alternative probes 18a and 18b in the FIG. 4 embodiment, the pit detection probe 18a does not include a general corrosion sensor plate 22 in a sensing unit 10a thereof, but may include certain other components (26a, 50, 54, 56) similar to multifunctional corrosion monitoring probe 18c components. The detection probe 18b may, in contrast to 18a, be multifunctional, where the probe 18b includes a sensing unit 10b having an alternative general corrosion sensor 52 with respect to 18c. The probe 18b may include components (26b, 50, 54, 56) similar to multifunctional corrosion monitoring probe 18c components.

Referring specifically to FIG. 5, an exemplary probe 18 may include a port 60 at a transmitter 58. The port 60 may permit the probe to be connected to any number of different data transmission devices (e.g., the probe 18 may be connected to another device, such as a known device, at an existing transmitter port for the other device). A separate modification port is not required in this particular embodiment. One or more transmission devices may be configured to transmit corrosion data to a processor comprising exemplary software for organizing and displaying corrosion data, although such is not necessarily required.

Figure 7:
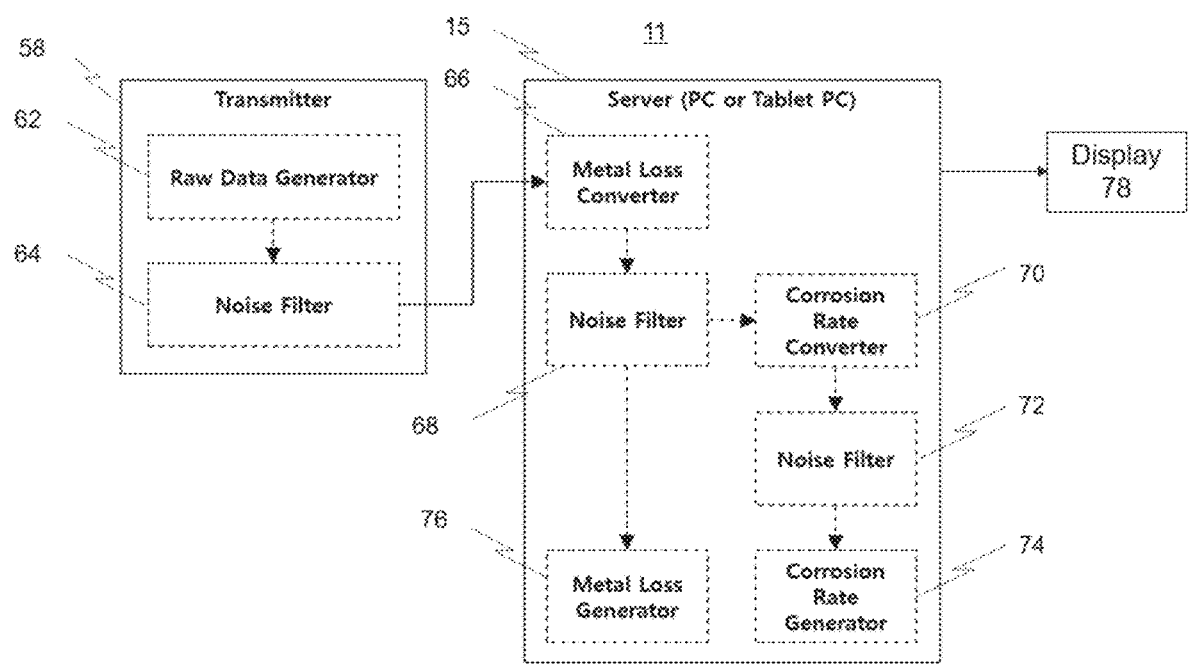
FIG. 7 illustrates exemplary logic of the FIG. 1 embodiment.
Figure 17:
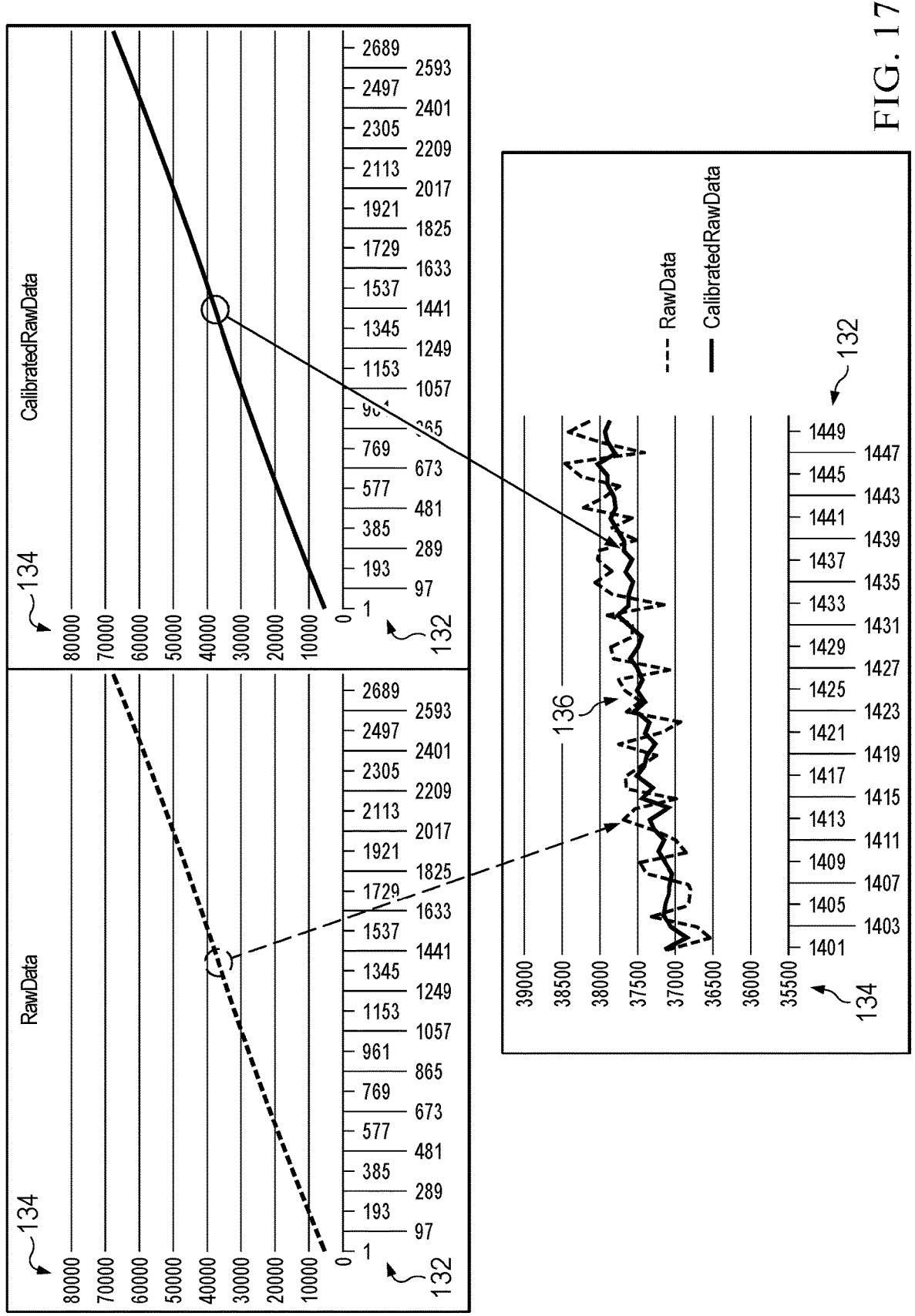
FIG. 17 illustrates various graphs of an exemplary data analysis interface.
Figure 18:
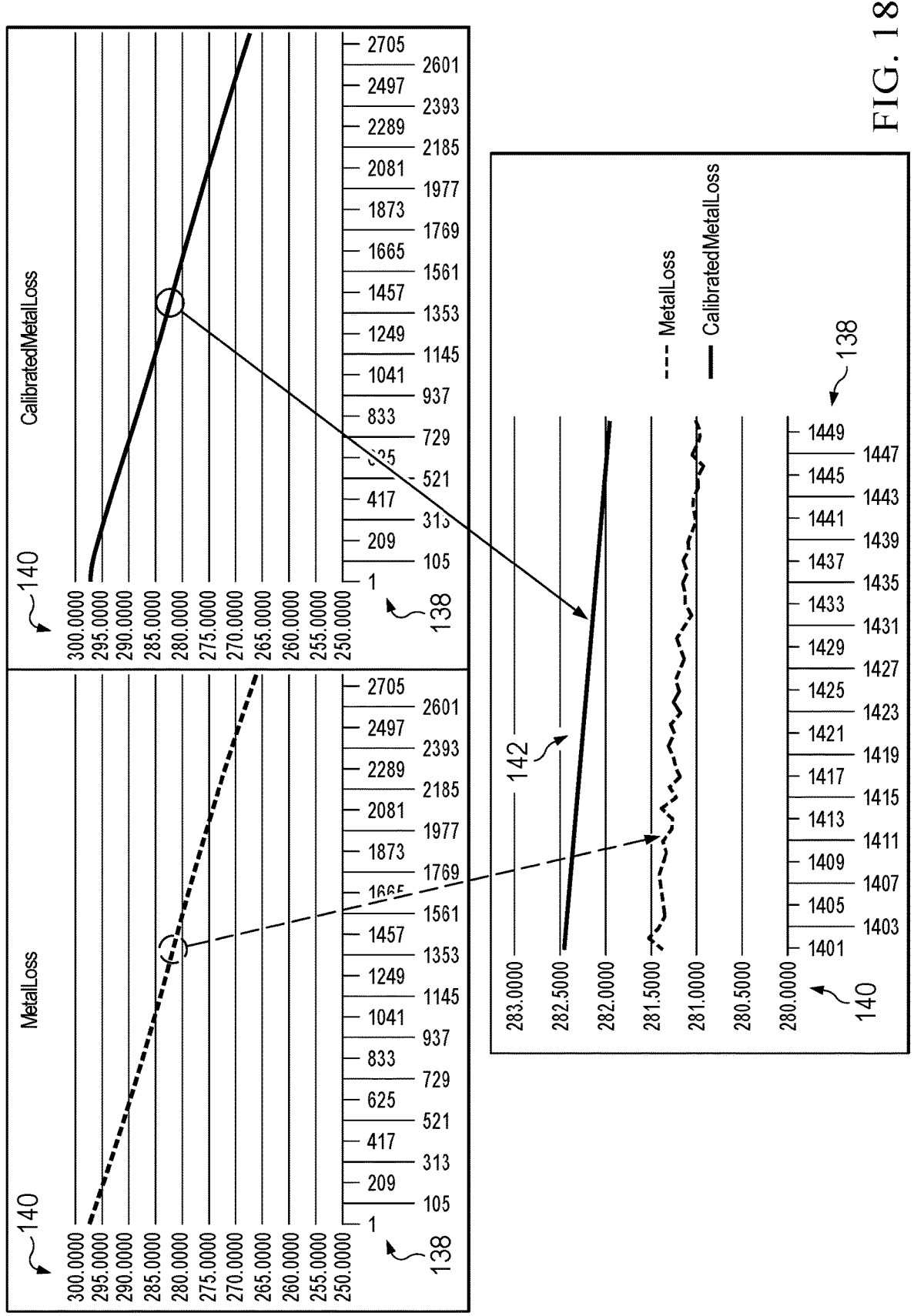
FIG. 18 illustrates other various graphs of an exemplary data analysis interface.

FIG. 7 demonstrates exemplary logic for noise removal and corrosion signal correction of an exemplary multifunctional corrosion monitoring system 11. A transmitter 58 may permit measurements (e.g., raw resistance changes) from an exemplary sensing unit to be registered and transmitted to a server (e.g., 15). A raw data generator 62 of the transmitter 58 may register measured resistance values and convert resistance deviation between sensor parts and reference parts into raw data. A software noise filter 64 may be linked to the transmitter 58, and may be configured to apply moving averages to reduce random noise in the raw data. Referring now to FIGS. 7 and 17, the server 15 may convert, output, and store raw data (e.g., resistance 134 over time 132, calibrated to 136) received from the transmitter 58 into metal loss and corrosion rate. A metal loss converter 66 module may convert raw data into metal loss based on a known relationship between resistance and metal loss. Referring to FIGS. 7 and 18, a low pass noise filter module 68 may be configured to remove noise from metal loss data (e.g., metal loss 140 over time 138, calibrated to 142).

Figure 19:
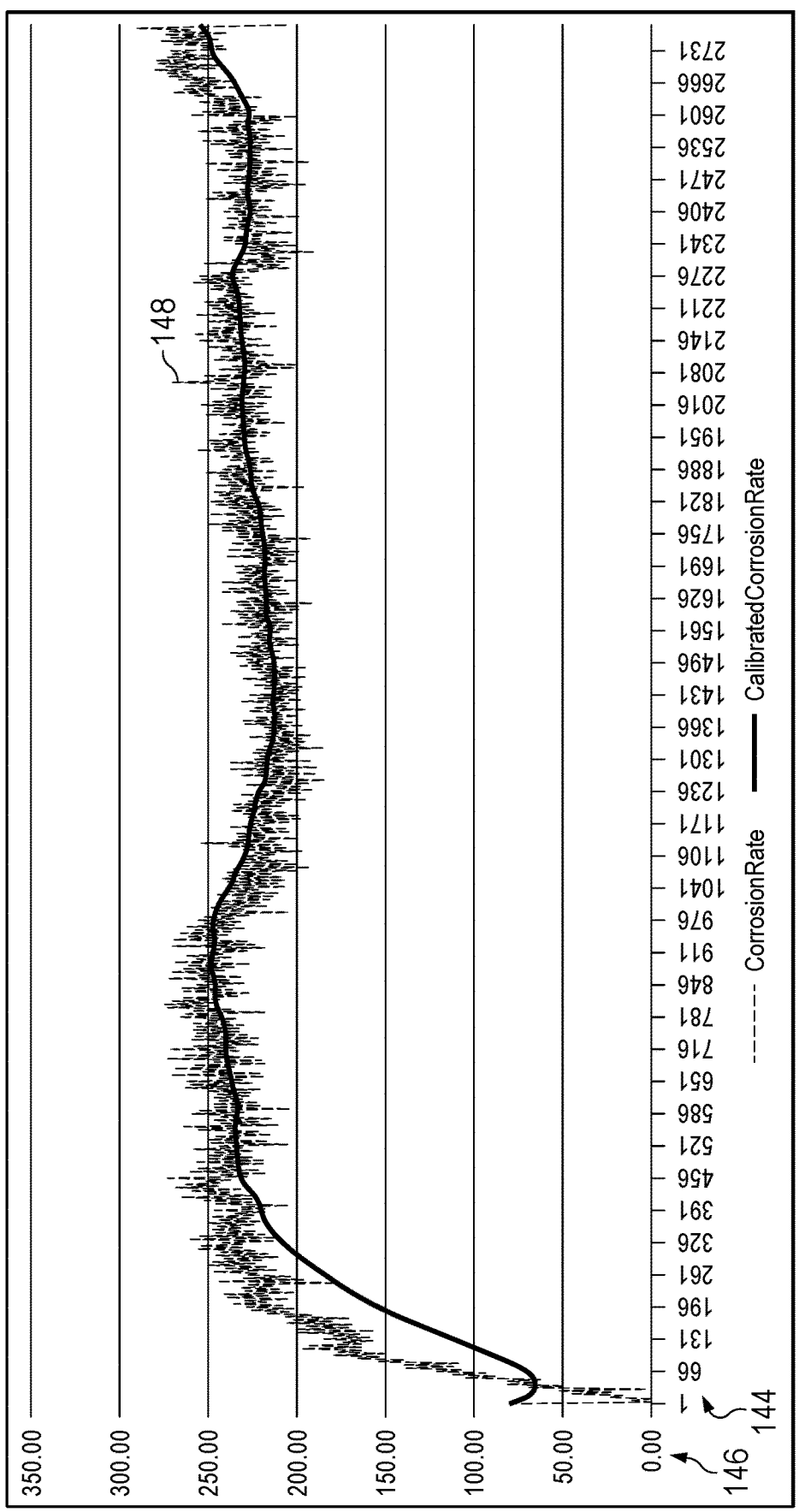
FIG. 19 illustrates another graph of an exemplary data analysis interface.

Referring to FIGS. 7 and 19, a metal loss generator module 76 may be configured to cause corrected metal loss data to be displayed (e.g., on digital display 78) and stored to a database. Metal loss may be expressed in any number of different mass units (e.g., grams). A corrosion rate converter module 70 may be configured to convert metal loss data received from the low pass noise filter module 68 into corrosion rate data 148 (e.g., corrosion rate 146 over time 144). A second low pass noise filter module 72 may be configured to remove noise included in corrosion rate data 148 to provide calibrated corrosion rate data. Corrosion rate may be expressed as unit loss of metal per time unit. Graphs for raw data, metal loss data and corrosion rate data may each be displayed by an exemplary display 78 linked to the server 15. A corrosion rate generator module 74 may be specifically configured to output corrected corrosion rate data on the display and/or save corrected corrosion rate data to a database. It will be apparent to one of ordinary skill in the art that the aforementioned modules are merely illustrative, and are in no way exhaustive of the scope of the present invention. It will also be apparent to one of ordinary skill in the art that exemplary data analysis and display (e.g., illustrated in FIGS. 7 and 17-19) may occur in accordance with any number of different software instructions.

Exemplary system software may be executed according to any number of different computing devices. Software instructions may be implemented according to any number of different software development tools and/or software programming languages. By way of example and not limitation, software instructions may be implemented using C, C++, C#, Java, Python, some combination thereof, or the like. An electronic storage medium may be used to store exemplary software and data thereof, and said software may be executed with the cooperation of a controller and memory.

The memory may be electronically connected to the processor and may store code to be executed by the processor. The memory may store information obtained from an exemplary multifunctional corrosion monitoring probe. By way of example and not limitation, the memory may store information about when different specimens become electrically connected with one another. The memory may also store instructions and/or information related to supporting various functions to be performed by an exemplary multifunctional corrosion monitoring probe. Said instructions and/or information may include instructions guiding measurement of pitting corrosion and/or general corrosion in an exemplary sensing unit (e.g., measurement of electric current, measurement of hole sizes, such as by drilling to permit said measurement, and the like). The memory may further store basic operational information (e.g., diagnostic data) and positional information related to the probe. It will be apparent to one of ordinary skill in the art that memory of an exemplary system may be permitted to engage in any number of different information and/or instruction storage functions without necessarily departing from the scope of the present invention.

Computing devices may include by way of example and not limitation, processors, microprocessors, microcontrollers, embedded processors, DSP, some combination thereof, or the like. An exemplary system computing device may control overall operations of a multifunctional corrosion monitoring system. Exemplary system software, including processing signals and information input and output thereof, may be executed by running an application program stored to the memory. As specific operations are performed by an exemplary computing device, historic information representing the historic execution of said operations may be analyzed according to one or more machine learning algorithms and/or machine learning techniques. Historic corrosion data may be updated and subsequent corrosion detection may be improved based on machine learning. The memory may store machine learning data and/or machine training data.

By applying a noise filter at various steps in an exemplary data refinement process, those tasked with monitoring corrosion may be readily able to monitor corrosion trends over time based on reliable data. Error values caused by thermal deformation, measurement errors caused by unexpected perturbations, some combination thereof, or the like may be removed in accordance with an exemplary method. An exemplary method may include amplifying sensor signal so that minute resistance measurements may be understood in the context of corrosion. Machine learning may be employed to improve the data refinement process over time.

Figure 8:
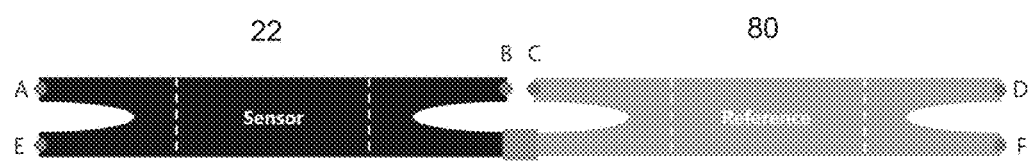
FIG. 8 illustrates exemplary sensor and reference electrodes in accordance with an exemplary embodiment.

A most relevant data point for metal loss may be displayed in a linear regression (e.g., after 100 data points per time interval specified for each data collection are analyzed using an exemplary system algorithm). In addition to being configured to display metal loss data and corrosion rate data, and exemplary graph output unit may be configured to evaluate current output from a power control unit, output resistance graphs, output current graphs, some combination thereof, or the like. A processor (e.g., 15) for an exemplary graph output unit may execute various software instructions for receiving an estimated current, and converting and outputting current values into a resistance graph and a current graph. Referring now to FIG. 8, a warning generation module may be configured to provide a warning when a resistance value or a current value (e.g., measured from sensor 22) changes over a reference value (e.g., measured from reference electrode 80) (reference electrode 80 may be an anode). A reference electrode 80 may permit control values to be communicated to the system for comparison with measured sensor values for accurate, calibrated corrosion detection.

Figure 9:
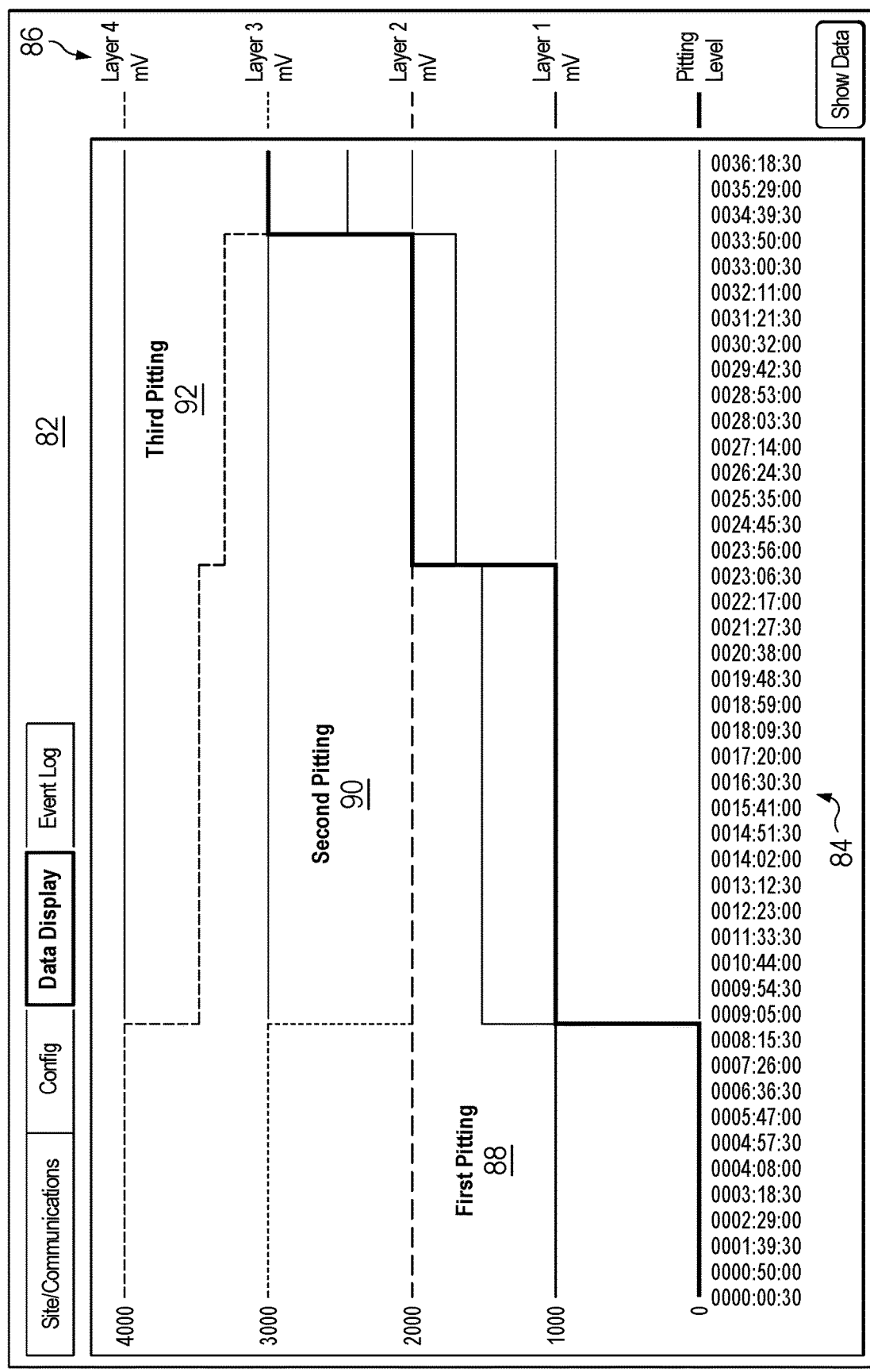
FIG. 9 illustrates an exemplary data display interface of the FIG. 7 embodiment.
Figure 11:
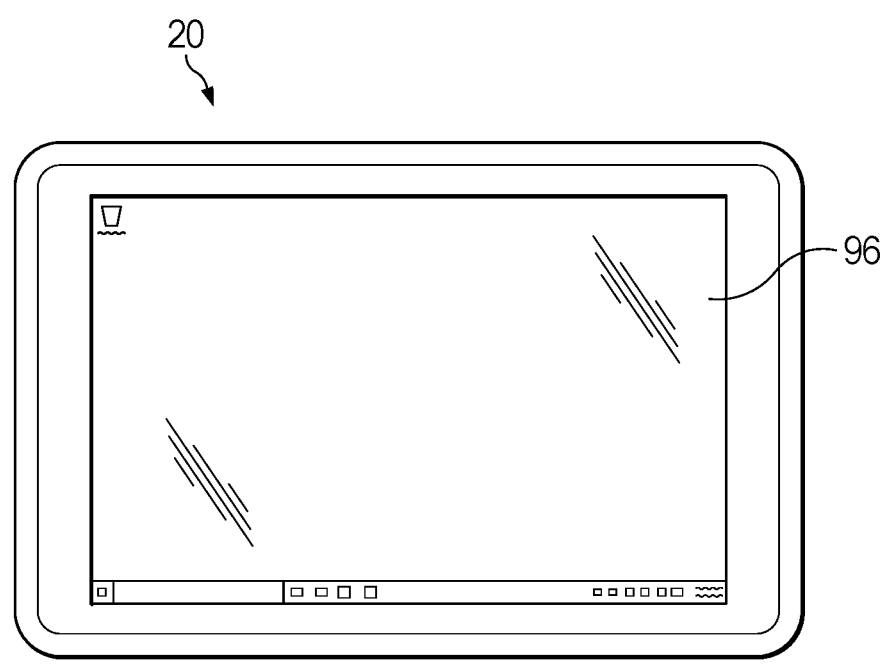
FIG. 11 illustrates an exemplary data logger in accordance with an exemplary embodiment.

Referring to FIGS. 9 and 11, an exemplary data display 82 (displayed by exemplary display 78 for a software interface) may display a pitting level 86 over time 84. Here, first pitting 88, second pitting 90, and third pitting 92 are shown over time 84. Alternatively, or additionally, a display may show when certain pitting occurs based on non-graph indicia (e.g., light up indicia for each pitting level). Exemplary software may also be configured to display data from other probes, and is not necessarily limited to displaying data from one exemplary multifunctional corrosion monitoring probe. An exemplary multifunctional corrosion monitoring system may be fully automated, requiring little to no user input. An exemplary system may also be configured to alert a user (e.g., by a warning signal) when pitting corrosion occurs, when a probe is at the end of its operational life, some combination thereof, or the like. By way of example and not limitation, system software may include a notification unit module for notifying users when corrosion occurs, a probe is at the end of its operational life, some combination thereof, or the like.

FIG. 11 specifically shows a tablet type portable data logger 20 having a touch screen display 96 permitting various functions of an exemplary system to be viewed, interacted with, executed, some combination thereof, or the like. The data logger 20 may be in electronic communication with an exemplary probe. The data logger 20 may automatically collect and store data in real time. The data logger 20 may be adapted to be connected to another computing device (e.g., for transfer of data to a PC or other computing device). The data logger 20 may permit users to interact with a display system map. The data logger 20 may permit users to view various graphs related to corrosion rate. It will be apparent to one of ordinary skill in the art that, although a data logger is not necessarily required, any number of different data loggers may be beneficial to exemplary data analysis and collection.

Figure 10:
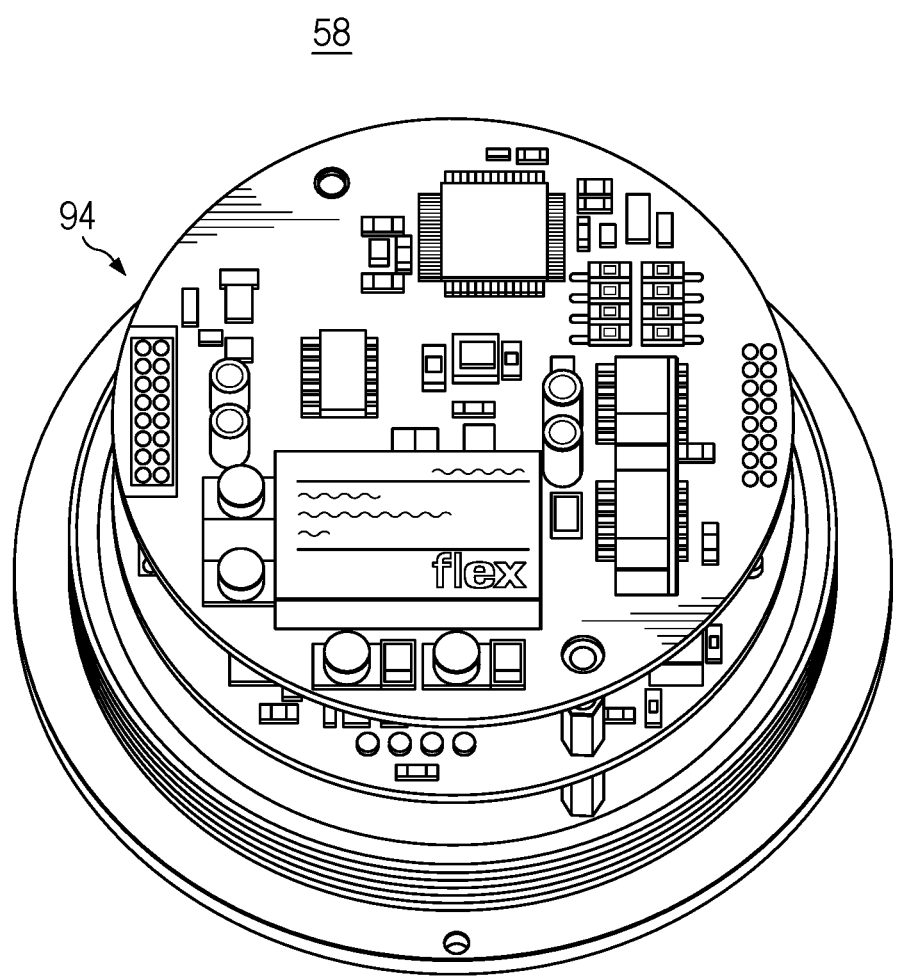
FIG. 10 illustrates an exemplary transmitter of the FIG. 5 embodiment.

Referring to FIG. 10, a high-resolution transmitter 58 (having circuitry 94) may include a self-diagnosis function for determining abnormal voltage and temperature. An error signal may be issued if the transmitter 58 requires maintenance or resetting due to a voltage issue, temperature issue, or the like. Exemplary software may be configured to communicate said error signal to a user to promote data reliability.

Figure 12:
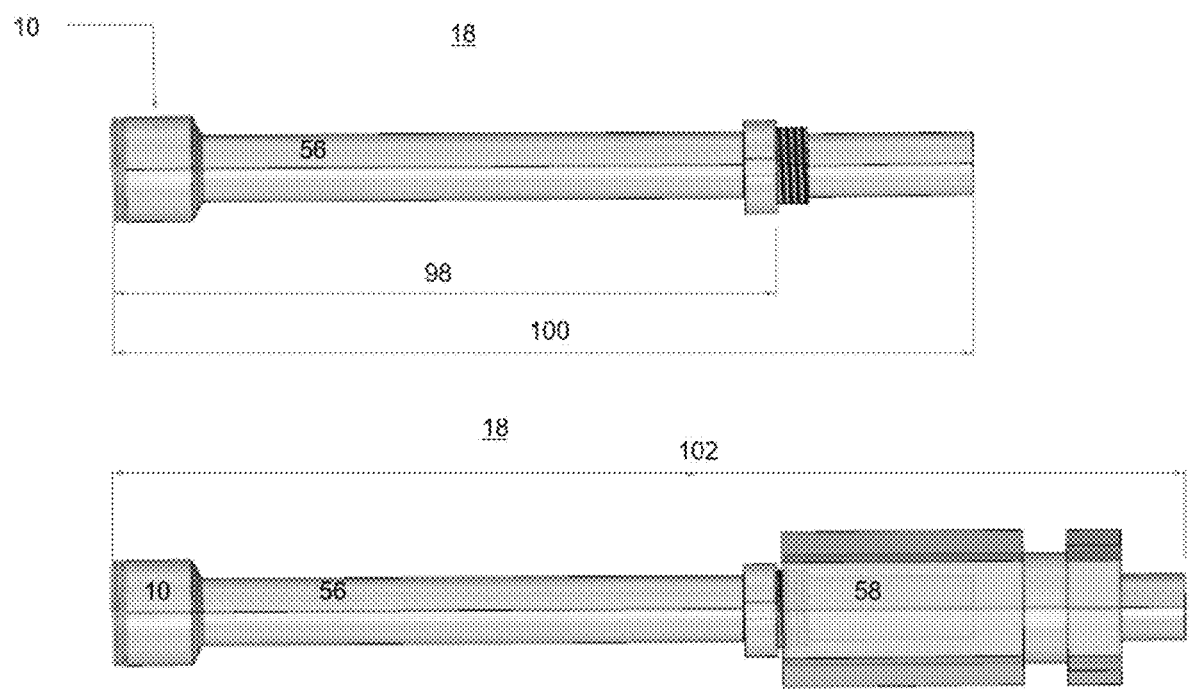
FIG. 12 illustrates exemplary probes in accordance with an exemplary embodiment.

FIG. 12 illustrates various views of an exemplary probe 18 having a shaft 56, sensing unit 10, and a transmitter 58. A power unit may be included with or proximate to the probe 18 (e.g., at or near the end of the probe having the transmitter 58). The sensing unit 10 and a portion of the shaft 56 may be positioned in a pipe. The occurrence of corrosion in the pipe may lead to measured changes in electrical characteristics of the sensing unit 10, permitting corrosion of the pipe to be detected. Various features of the probe may have any number of different lengths 98, 100, 102 without departing from the scope of the present invention. An exemplary probe 18 may be configured to withstand temperatures up to 302° F. (150° C.), and pressure up to 1,450 psi (100 bar), although such is not required. An exemplary probe 18 may be of a fixed length in certain embodiments, and may be retractable in other embodiments.

Referring now to FIGS. 13-16, real time monitoring of pitting 104a-b (showing pitting corrosion expanding from first pitting to second pitting) corrosion is shown. In this particular embodiment, graphs 108, 122, and 124 illustrate resistance 110 (e.g., in Ohms) across both specimens 32 and 34 (graph 124), both specimens 34 and 36 (graph 122), and both specimens 36 and 38 (graph 108) of the specimen stack 26 over time 111. During time 111, the resistance value 110 measured for both the first specimen 38 and the second specimen 36 (shown in graph 108) may be maintained at a high initial level 112 due to the presence of the insulation layer 44 (and likewise for the resistance values 110 at levels 112 in graphs 122 and 124). From time 111 to time 130 (representing progression of pitting corrosion from 104a to 104b), resistance 110 measured for both the first specimen 38 and the second specimen 36 may significantly decrease or change (illustrated by 128) from the initial level 112 (corresponding to pitting 104b-which may form in the shape of a hole). Pitting corrosion 104b penetrating beyond the first specimen 38 may cause an insulating layer 44 between the first specimen 38 and the second specimen 36 to dissolve, causing less opposition to current flow across the two specimens 36, 38. Where pitting corrosion extends beyond the second specimen 36, resistance 110 illustrated by graph 122 may decrease or change from an initial level 112. Where pitting corrosion extends beyond the third specimen 34, resistance 110 illustrated by graph 124 may decrease or change from an initial level 112.

Alternatively, or additionally, resistance may be measured in each specimen individually and graphed over time accordingly. Changes in resistance in an individual specimen may correspond to pitting corrosion in that specimen (e.g., as cavities or abrasions form in the specimen, electric current flow across the specimen may change as a result). It will be apparent to one of ordinary skill in the art that resistance over time graphs may also be generated for general corrosion measurements from an exemplary general corrosion sensor plate. It will also be apparent to one of ordinary skill in the art that all graphs shown and described herein are merely illustrative, and are in no way exhaustive of the scope of the present invention.

Figure 21:
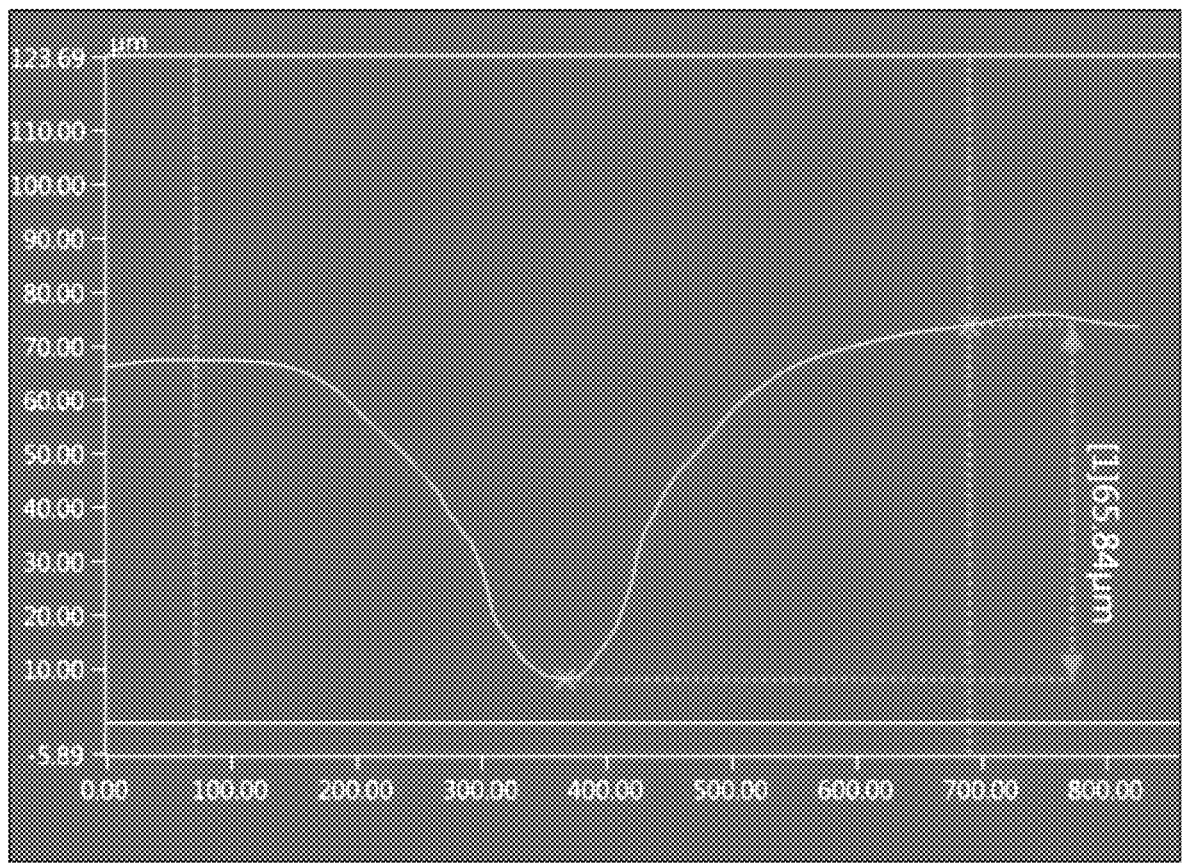
FIG. 21 illustrates graphed pitting corrosion depth in accordance with an exemplary embodiment.

Referring now to FIGS. 20-21, a weight loss coupon 150 is shown positioned next to a pit detection probe 152. It will be apparent to one of ordinary skill in the art that weight loss coupons and pit detection probes may be included in an exemplary system in addition to an exemplary multifunctional corrosion monitoring probe without departing from the scope of the present invention. By way of example and not limitation, there may be advantages to comparing data from an exemplary multifunctional corrosion monitoring probe with data from a weight loss coupon, pit detection probe, or the like. Pitting corrosion (e.g., 154 in FIG. 20) depth of a weight loss coupon may not exceed 66 μm in certain embodiments (e.g., shown by maximum pitting depth in graph 156). An exemplary multifunctional corrosion monitoring probe may permit any number of pitting depths to be analyzed.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:
1. A system for monitoring corrosion comprising:
 a sensing unit comprising:
  a specimen stack, including a plurality of conductive specimens;
  a general corrosion sensor separate from the specimen stack;
 a power controller;
 a transmitter;
  wherein the general corrosion sensor is a plate spaced apart from the specimen stack, and is surrounded by an amount of corrosion resistant material positioned between the general corrosion sensor and the specimen stack;

wherein the corrosion resistant material secures the plate in spaced relation to, and isolated from the specimen stack while allowing the plate and the specimen stack to contact a fluid;

wherein the power controller is configured to apply electric current to one or more specimens of the specimen stack and the general corrosion sensor; and wherein the transmitter is capable of communicating a measurement associated with the specimen stack to one or more processors for determining an estimate of corrosion.

2. The system of claim 1 wherein the estimate of corrosion is an estimate of pitting corrosion.

3. The system of claim 1 wherein the estimate of corrosion is an estimate of general corrosion.

4. The system of claim 1 wherein the specimen stack comprises at least four specimens.

5. The system of claim 1 wherein the specimen stack is insulated.

6. The system of claim 1, wherein the processor is configured with software instructions to organize raw data of electrical resistance measured in the specimen stack into a graph for showing corrosion rate.

7. The system of claim 1 wherein the processor is adapted to receive raw data of electrical resistance measured in each of the specimen stack and the general corrosion sensor.

8. The system of claim 1 wherein:
the measurement of electric current in the specimen stack is an electrical resistance measurement; and
the measurement of electric current in the general corrosion sensor is an electrical resistance measurement.

9. The system of claim 1 wherein the sensing unit defines a head portion of a probe adapted to be inserted into a pipe.

10. A system for monitoring corrosion comprising:
a sensing unit comprising:
a specimen stack, including a plurality of conductive specimens;
a general corrosion sensor separate from the specimen stack;
an insulating module;
a power controller;
a transmitter;
wherein the general corrosion sensor is a plate spaced apart from the specimen stack, and is surrounded by an amount of corrosion resistant material positioned between the general corrosion sensor and the specimen stack;

wherein the corrosion resistant material secures the plate in spaced relation to, and isolated from the specimen stack while allowing the plate and the specimen stack to contact a fluid;

wherein the power controller is configured to apply electric current to one or more specimens of the specimen stack and the general corrosion sensor; and wherein the transmitter is capable of communicating a measurement of electrical resistance in the specimen stack to one or more processors to permit corrosion to be estimated.

11. The system of claim 10 wherein at least one specimen layer comprises carbon steel, and the general corrosion sensor comprises a material different from carbon steel.

12. A method for monitoring corrosion comprising:
providing a sensing unit comprising:
a specimen stack, including a plurality of conductive specimens;
a general corrosion sensor separate from the specimen stack, the general corrosion sensor comprising a plate;
providing a power controller;
providing a transmitter;
spacing the plate apart from the specimen stack, and surrounding the plate with an amount of corrosion resistant material, the corrosion resistant material positioned between the general corrosion sensor and the specimen stack, wherein the corrosion resistant material secures the plate in spaced relation to, and isolated from the specimen stack while allowing the plate and the specimen stack to contact a fluid;
configuring the power controller to apply electric current to one or more specimens of the specimen stack and the general corrosion sensor; and
configuring the transmitter to be capable of communicating an electrical measurement in the specimen stack to one or more processors to permit corrosion to be estimated.

13. The system of claim 4, wherein the at least four specimens are arranged in order of increasing thickness.

14. The system of claim 1, wherein the corrosion resistant material is pit impermeable.

* * * * *